(12) United States Patent
Jeong et al.

(10) Patent No.: US 11,839,855 B2
(45) Date of Patent: Dec. 12, 2023

(54) FILTER MEDIUM, MANUFACTURING METHOD THEREFOR, AND FILTER UNIT INCLUDING SAME

(71) Applicant: AMOGREENTECH CO., LTD., Gyeonggi-do (KR)

(72) Inventors: Ui Young Jeong, Incheon (KR); In Yong Seo, Seoul (KR)

(73) Assignee: AMOGREENTECH CO., LTD., Gyeonggi-do (KR)

(*) Notice: Subject to any disclaimer, the term of this patent is extended or adjusted under 35 U.S.C. 154(b) by 182 days.

(21) Appl. No.: 16/620,470

(22) PCT Filed: Jun. 11, 2018

(86) PCT No.: PCT/KR2018/006578
§ 371 (c)(1),
(2) Date: Dec. 6, 2019

(87) PCT Pub. No.: WO2018/226076
PCT Pub. Date: Dec. 13, 2018

(65) Prior Publication Data
US 2021/0086136 A1 Mar. 25, 2021

(30) Foreign Application Priority Data
Jun. 9, 2017 (KR) .................. 10-2017-0072530

(51) Int. Cl.
*B01D 61/14* (2006.01)
*B01D 63/08* (2006.01)
(Continued)

(52) U.S. Cl.
CPC .......... *B01D 61/145* (2013.01); *B01D 63/08* (2013.01); *B01D 67/0002* (2013.01);
(Continued)

(58) Field of Classification Search
None
See application file for complete search history.

(56) References Cited

U.S. PATENT DOCUMENTS 6,492,183 B1* 12/2002 Perman ............. B01D 11/0219
436/178
7,504,550 B2 3/2009 Tippey et al.
(Continued)

FOREIGN PATENT DOCUMENTS

JP 09-206568 8/1997
JP 2002-524243 8/2002
(Continued)

OTHER PUBLICATIONS

Kim et al, Preparation of Composite Membranes via PVA/PAM Solution Coating onto Hydrophilized PVDF Hollow Fiber Membrane and Their Pervaporation Separation of Water-ethanol Mixture, Membrane Journal, vol. 23 No. Aug. 4, 2013, 312-318 (Year: 2013).*

*Primary Examiner* — Jason M Greene
*Assistant Examiner* — Eric J McMullough
(74) *Attorney, Agent, or Firm* — MORRISON & FOERSTER, LLP

(57) ABSTRACT

A filter medium is provided. According to one embodiment of the present invention, the filter medium is implemented by including: a porous second support and a nanofiber web which are sequentially stacked on each of an upper portion and a lower portion of a first support; and a channel through which a filtrate filtered in the nanofiber web flows in a direction of the first support, wherein the first support, the second support, and the nanofiber web satisfy predetermined conditions on a basis weight and a thickness of each layer. In a water treatment operation of the filter medium, the shape, structural deformation, and damage of the filter medium can be minimized, excellent filtration efficiency can (Continued)

be implemented, and a channel can be smoothly secured, thereby securing high flux. In addition, even at high pressure applied during backwashing, the filter medium has an extended use period due to excellent durability of the filter medium. Accordingly, the filter medium can be variously applied in various water treatment fields.

11 Claims, 7 Drawing Sheets

(51) Int. Cl.
    *B01D 67/00*     (2006.01)
    *B01D 69/02*     (2006.01)
    *B01D 69/10*     (2006.01)
    *B01D 71/34*     (2006.01)
    *C02F 1/44*     (2023.01)

(52) U.S. Cl.
    CPC ............. *B01D 69/02* (2013.01); *B01D 69/10* (2013.01); *B01D 71/34* (2013.01); *C02F 1/444* (2013.01); *B01D 2323/39* (2013.01); *B01D 2325/02* (2013.01); *B01D 2325/04* (2013.01); *B01D 2325/34* (2013.01)

(56) References Cited

U.S. PATENT DOCUMENTS

| | | |
|---|---|---|
| 7,951,425 B2 | 5/2011 | Demir et al. |
| 11,319,211 B2 | 5/2022 | Choi |
| 11,324,123 B2 | 5/2022 | Seo et al. |
| 11,359,064 B2 | 6/2022 | Choi |
| 2008/0153959 A1 | 6/2008 | Charati et al. |
| 2010/0096317 A1* | 4/2010 | Morita .................. B01D 71/36 210/321.84 |
| 2010/0129628 A1 | 5/2010 | Young et al. |
| 2010/0206614 A1 | 8/2010 | Park et al. |
| 2014/0186561 A1 | 7/2014 | Bhattacharya et al. |
| 2014/0287230 A1 | 9/2014 | Walls et al. |
| 2014/0335459 A1 | 11/2014 | Im et al. |
| 2015/0072070 A1 | 3/2015 | Saijo et al. |
| 2015/0104565 A1 | 4/2015 | Chen et al. |
| 2015/0257263 A1 | 9/2015 | Sethumadhavan et al. |
| 2016/0111730 A1 | 4/2016 | Kim et al. |
| 2016/0136584 A1 | 5/2016 | Hwang et al. |
| 2016/0159667 A1 | 6/2016 | Hwang et al. |
| 2016/0229719 A1 | 8/2016 | Seo et al. |
| 2017/0005504 A1 | 1/2017 | Rho et al. |
| 2017/0107355 A1 | 4/2017 | Kim et al. |
| 2020/0137891 A1 | 4/2020 | Seo et al. |
| 2020/0283618 A1 | 5/2020 | Choi et al. |
| 2021/0188648 A1 | 6/2021 | Choi |

FOREIGN PATENT DOCUMENTS

| | | | |
|---|---|---|---|
| JP | 2014-030825 | 2/2014 | |
| JP | 2014-201676 | 10/2014 | |
| JP | 2015-088537 | 5/2015 | |
| KR | 10-0862149 | 10/2008 | |
| KR | 10-0871440 | 12/2008 | |
| KR | 10-2009-0058513 | 6/2009 | |
| KR | 10-2010-0023646 | 3/2010 | |
| KR | 10-2010-0070041 | 6/2010 | |
| KR | 10-1139970 | 4/2011 | |
| KR | 10-2014-0015890 | 2/2014 | |
| KR | 10-1387086 | 4/2014 | |
| KR | 10-2014-0128528 | 11/2014 | |
| KR | 10-2015-0040692 | 4/2015 | |
| KR | 10-1545430 | 8/2015 | |
| KR | 10-2015-0110058 | 10/2015 | |
| KR | 10-2016-0031103 | 3/2016 | |
| KR | 10-2016-0042299 | 4/2016 | |
| KR | 10-2016-0126893 | 11/2016 | |
| KR | 10-2017-0023394 | 3/2017 | |
| KR | 10-2017-0135768 | 12/2017 | |
| KR | 10-2018-0018932 | 2/2018 | |
| KR | 10-2018-0018934 | 2/2018 | |
| KR | 10-2018-0069340 | 6/2018 | |
| KR | 10-2018-0069350 | 6/2018 | |
| WO | WO 2000/015331 | 3/2000 | |
| WO | WO-2015053443 A1 * | 4/2015 | ......... B01D 39/1623 |
| WO | WO 2015/108247 | 7/2015 | |
| WO | WO 2015/147501 | 10/2015 | |

\* cited by examiner

FILTER MEDIUM, MANUFACTURING METHOD THEREFOR, AND FILTER UNIT INCLUDING SAME

CROSS REFERENCE TO RELATED APPLICATIONS

This application is a national stage application under 35 U.S.C. § 371 of International Application No. PCT/KR2018/006578, filed internationally on Jun. 11, 2018, which claims priority to Korean Patent Application No. 10-2017-0072530, filed Jun. 9, 2017, the disclosures of which are incorporated herein by reference in their entirety.

TECHNICAL FIELD

The present invention relates to a filter medium, and more specifically, to a filter medium, a manufacturing method of the filter medium, and a filter unit including the filter medium.

BACKGROUND ART

Separation membranes may be classified into microfiltration (MF) membranes, ultrafiltration (UF) membranes, nanofiltration (NF) membranes, and reverse osmosis (RO) membranes according to a pore size.

Although the above-exemplified separation membranes differ in usages and pore sizes, the separation membranes have a common feature of being filtration media composed of a fiber or porous polymer filtration media or having the form of a composite membrane thereof.

Generally, the porous polymer filtration media are prepared through a method of forming pores in a polymer membrane or a polymer hollow fiber using a separate pore-forming agent contained in a solution by sintering the pore-forming agent or dissolving the pore-forming agent in an external coagulating solution. On the other hand, the filtration media composed of the fiber are generally prepared by accumulating produced short fibers and then applying heat, pressure, or the like thereto, or by spinning the short fibers and concurrently applying heat, pressure, or the like thereto.

A typical example of the filtration media composed of the fiber is a nonwoven fabric. In general, pores of the nonwoven fabric are controlled by a diameter of a short fiber, a basis weight of a medium, and the like. However, since a diameter of a short fiber included in a general nonwoven fabric is in the unit of microns, there is a limitation in implementing a separation membrane having a fine and uniform pore structure only by controlling a diameter and basis weight of a fiber. Accordingly, only a separation membrane such as a microfiltration membrane may be implemented using a general nonwoven fabric, and it is difficult to implement a separation membrane such as an ultrafiltration membrane or a nanofiltration membrane for filtering finer particles.

A method designed to solve such a problem is to use a separation membrane composed of a microfiber having a nanoscale fiber diameter. However, it is difficult to prepare a microfiber having a nanoscale diameter by spinning only once through a general fiber spinning process such as a wet spinning process, and thus there are problems of inconvenience that it is necessary to spin sea-island yarn or the like and separately elute a sea component to obtain an island component which is a microfiber, a cost increase, and extension of production time. Accordingly, recently, there has been a tendency to directly spin a fiber having a nanoscale diameter through electro spinning and produce a large number of filtration media composed of the fiber.

Meanwhile, some of various foreign substances included in water to be treated may remain in pores of a filtration medium on which a water treatment process is repeated, or an attached layer may be formed on a surface of the filtration medium. In this case, the foreign substances remaining in the filtration medium reduce a filtration function.

In order to solve such a problem, it is possible to consider a method of preventing the occurrence of such a fouling phenomenon itself through pretreatment or a method of washing a filtration medium in which the fouling phenomenon has already occurred. Generally, the method of washing the filtration medium is performed in such a manner that foreign substances remaining in a filtration medium are removed by applying high pressure to the filtration medium in a direction opposite to a path through which water to be treated is introduced into the filtration medium and is filtrated and discharged.

However, the high pressure applied when the filtration medium is washed may cause damage to the filtration medium, and in the case of a filtration medium having a multi-layered structure, delamination may occur.

Meanwhile, high pressure may be applied to the filtration medium even in a filtration process. In this case, the filtration medium may be pressed in a direction in which the pressure is applied, and thus, a channel may not be smoothly secured. Thus, flux may be considerably reduced.

Accordingly, there is an urgent need to develop a filter medium in which, even in a backwashing process performed at high pressure, the shape, structural deformation, and damage of a filter medium are minimized, and concurrently, a channel may be smoothly secured, thereby securing high flux and a fast treatment rate of water to be treated.

DISCLOSURE

Technical Problem

The present invention is directed to providing a filter medium in which during a water treatment operation of a filter medium, the shape, structural deformation, and damage of the filter medium are minimized, and concurrently a channel is smoothly secured, thereby implementing high flux, excellent filtration efficiency, and a fast treatment rate, and a manufacturing method thereof.

In addition, the present invention is directed to providing a filter medium having excellent durability in which a channel may be secured even at high pressure applied in a backwashing process, and the delamination, film damage, and the like may be minimized, and a manufacturing method thereof.

Furthermore, the present invention is directed to providing a flat filter unit and a filter module, which are variously applicable in water treatment fields through a filter medium having excellent water permeability and durability.

Technical Solution

According to an exemplary embodiment of the present invention, a filter medium includes a second support with porosity and a nanofiber web which are sequentially stacked on each of an upper portion and a lower portion of a first support with porosity, and a channel through which a filtrate filtered in the nanofiber web flows in a direction of the first support, wherein the first support, the second support, and the nanofiber web satisfy at least one condition selected from condition (1) and condition (2) below:

$$(b_1+c_1)/a_1 \leq 0.9 \text{ and } c_1/b_1 \leq 2.1, \text{ and} \quad (1)$$

$$(b_2+c_2)/a_2 \leq 0.32 \text{ and } c_2/b_2 \leq 2.1, \quad (2)$$

wherein $a_1$, $b_1$, and $c_1$ respectively refer to basis weights (g/m$^2$) of the first support, the second support, and the nanofiber web, and $a_2$, $b_2$, and $c_2$ respectively refer to thicknesses (mm) of the first support, the second support, and the nanofiber web.

According to an exemplary embodiment of the present invention, the first support, the second support, and the nanofiber web may satisfy at least one condition selected from condition (1) and condition (2) below:

$$0.06 \leq (b_1+c_1)/a_1 \leq 0.67 \text{ and } 0.02 \leq c_1/b_1 \leq 0.46, \text{ and} \quad (1)$$

$$0.027 \leq (b_2+c_2)/a_2 \leq 0.29 \text{ and } 0.0022 \leq c_2/b_2 \leq 1.1. \quad (2)$$

The first support may have a basis weight ranging from 250 g/m$^2$ to 800 g/m$^2$, the second support may have a basis weight ranging from 10 g/m$^2$ to 200 g/m$^2$, and the nanofiber web may have a basis weight ranging from 0.05 g/m$^2$ to 20 g/m$^2$.

The first support may have a thickness ranging from 2 mm to 8 mm, the second support may have a thickness ranging from 100 μm to 400 μm, and the nanofiber web may have a thickness ranging from 0.5 μm to 200 μm.

The first support and the second support may include a nonwoven fabric, and the first support, the second support, and the nanofiber web may satisfy condition (3) below:

$$(b_3+c_3)/a_3 \leq 6.4 \text{ and } c_3/b_3 \leq 0.21, \quad (3)$$

wherein a3, b3, and c3 respectively refer to fiber average diameters (μm) of the first support, the second support, and the nanofiber web.

The first support may have a fiber average diameter ranging from 5 μm to 50 μm, the second support may have a fiber average diameter ranging from 5 μm to 30 μm, and the nanofiber web may have a fiber average diameter ranging from 0.05 μm to 1 μm.

The second support may include a second composite fiber which includes a support component and a low melting point component and is disposed such that at least a portion of the low melting point component is exposed at an outer surface thereof, and the low melting point component of the second composite fiber may be fused to the nanofiber web.

The first support may include a first composite fiber which includes a support component and a low melting point component and is disposed such that at least a portion of the low melting point component is exposed at an outer surface thereof, and the low melting point component of the first composite fiber and the low melting point component of the second composite fiber may be fused to each other to bond the first support and the second support.

The nanofiber web may include a fluorine-based compound as a fiber-forming component, and the fluorine-based compound may include at least one compound selected from the group consisting of polytetrafluoroethylene (PTFE)-based, tetrafluoroethylene-perfluoroalkyl vinyl ether (PFA) copolymer-based, tetrafluoroethylene-hexafluoropropylene (FEP) copolymer-based, tetrafluoroethylene-hexafluoropropylene-perfluoroalkyl vinyl ether (EPE) copolymer-based, tetrafluoroethylene-ethylene (ETFE) copolymer-based, polychlorotrifluoroethylene (PCTFE)-based, chlorotrifluoroethylene-ethylene (ECTFE) copolymer-based, and polyvinylidene fluoride (PVDF)-based compounds.

The nanofiber web may have an average pore size ranging from 0.1 μm 3 μm and a porosity ranging from 60% to 90%.

The filter medium may be an ultrafiltration membrane.

According to an exemplary embodiment of the present invention, a manufacturing method of a filter medium includes (1) laminating a nanofiber web and a second support; and (2) disposing the laminated nanofiber web and second support on each of both surfaces of a first support such that the second support is in contact with the first support and performing laminating thereon, wherein the first support, the second support, and the nanofiber web satisfy at least one condition selected from condition (1) and condition (2) below:

$$(b1+c1)/a1 \leq 0.9 \text{ and } c1/b1 \leq 2.1, \text{ and} \quad (1)$$

$$(b2+c2)/a2 \leq 0.32 \text{ and } c2/b2 \leq 2.1, \quad (2)$$

wherein a1, b1, and c1 respectively refer to basis weights (g/m2) of the first support, the second support, and the nanofiber web, and a2, b2, and c2 respectively refer to thicknesses (mm) of the first support, the second support, and the nanofiber web.

According to an exemplary embodiment of the present invention, operation (1) may include 1-1) electrospinning a nanofiber on the second support to form the nanofiber web, and 1-2) laminating the nanofiber web and the second support by applying heat and pressure in both directions of the second support on which the nanofiber web is formed.

According to an exemplary embodiment of the present invention, a flat filter unit includes the filter medium according to the present invention and a support frame which includes a channel configured to allow a filtrate filtered in the filter medium to be discharged to the outside and supports an edge of the filter medium.

Advantageous Effects

According to the present invention, during a water treatment operation of a filter medium, the shape, structural deformation, and damage of the filter medium can be minimized, excellent filtration efficiency can be implemented, and a channel can be smoothly secured, thereby securing high flux. In addition, even at high pressure applied during backwashing, the filter medium has an extended use period due to excellent durability of the filter medium. Accordingly, the filter medium can be variously applied in various water treatment fields.

DESCRIPTION OF DRAWINGS

FIG. 4 is a set of schematic views illustrating that a filter medium is laminated according to an exemplary embodiment of the present invention.

5A is a scanning electron microscope (SEM) image of a surface of the nanofiber web, and FIG. 5B is a SEM image of a cross section of the nanofiber web.

FIG. 7 is a set of views illustrating a flat filter unit according to an exemplary embodiment of the present invention.

MODES OF THE INVENTION

Figure 1:
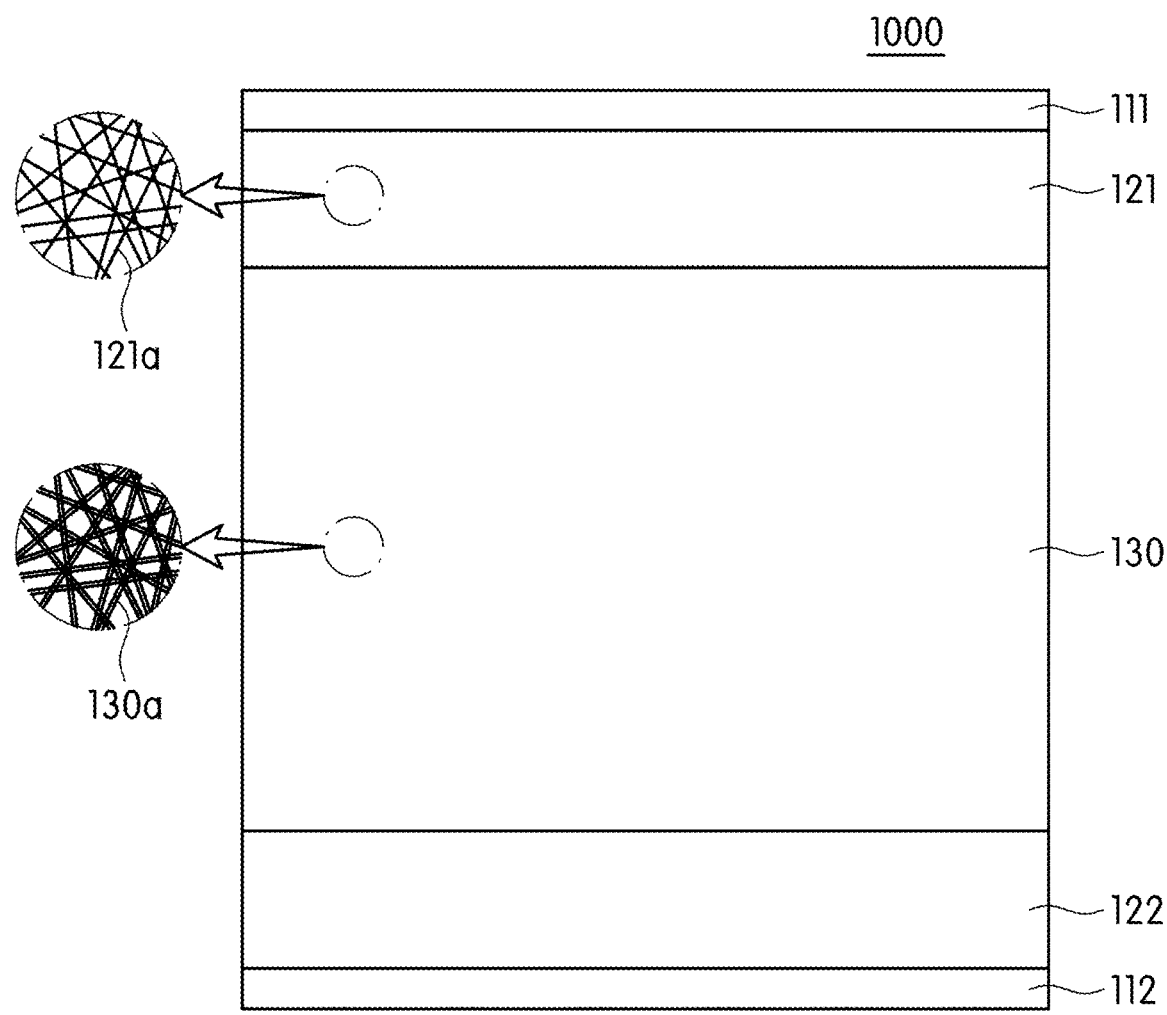
FIG. 1 is a cross-sectional view illustrating a filter medium according to an exemplary embodiment of the present invention.

Hereinafter, exemplary embodiments of the present invention will be described in detail with reference to the accompanying drawings so as to be easily practiced by a person of ordinary skill in the art. It should be understood that the present invention may be embodied in different ways and is not limited to the following exemplary embodiments. Parts irrelevant to description are omitted in the drawings in order to clearly explain the embodiments of the present invention, and like reference numerals refer to like elements throughout the specification.

As shown in FIG. 1, a filter medium 1000 according to an exemplary embodiment of the present invention includes porous second supports 121 and 122 and nanofiber webs 111 and 112 which are sequentially stacked on upper and lower portions of a porous first support 130. A filtrate filtered in the nanofiber webs 111 and 112 has a filtration flow so as to flow in a direction of the first support 130.

As shown in FIG. 1, the filter medium 1000 according to the present invention has a structure of at least five layers and includes two kinds of supports 121/122 and 130 having different thicknesses. Before describing each layer constituting the filter medium 1000 according to the present invention, a reason why the first support 130, the second supports 121 and 122, and the nanofiber webs 111 and 112 included in the filter medium 1000 of the present invention should satisfy conditions 1 and 2 below and a reason why the second support should be provided in the filter medium in addition to the first support will be described first.

As a water treatment process using a filter medium is repeated, foreign substances included in water to be treated are attached to the filter medium to form an attached layer or are embedded in the filter medium to block a channel and reduce a filtration function. When the filter medium is replaced whenever such a problem occurs, costs of water treatment are increased. Accordingly, in order to extend a use period of a filter medium, it is necessary to perform a washing process of periodically applying a physical stimulus to the filter medium to remove foreign substances attached to or embedded in the filter medium, which is called backwashing. In general, in the backwashing, the foreign substances attached to or embedded in the filter medium are removed by allowing washing water to strongly flow or blowing air in a direction opposite to a filtering direction of the filter medium. In order to supply the washing water or air to the filter medium and concurrently remove the foreign substances, it is necessary to supply the washing water or air at a pressure higher than pressure applied to the filter medium in a filtration process.

Accordingly, in order for the filter medium to have an ability to withstand backwashing, it is important that the filter medium has a certain level of mechanical strength so as to not be deformed or damaged even at high pressure applied thereto. A support for supplementing mechanical strength is usually provided in the filter medium. Factors capable of affecting mechanical strength of a support include a structure of the support. In an example, when the support is a nonwoven fabric, the factors may include a diameter of a fiber forming the nonwoven fabric, a length of the fiber, bonding between the fibers, a thickness of the fiber, and a basis weight of the fiber. As the thickness or the basis weight is increased, the mechanical strength of the support may be increased. Therefore, as an example for designing a filter medium resistant to backwashing, a thick nonwoven fabric may be used, or a nonwoven fabric, of which a thickness is slightly small but a basis weight thereof is very large, may be used as a support.

Meanwhile, a support may have a large pore size so as to not affect a flow of a filtrate of a filter medium. A reduction in flux due to a support provided to supplement mechanical strength lowers main physical properties of a filter medium, which is very undesirable. However, when a nonwoven fabric, which is thin but exhibits sufficient mechanical strength, is used as a support, since a basis weight of the nonwoven fabric is very large, a pore diameter and porosity in the nonwoven fabric may be inevitably considerably small, and a flow of a filtrate of a filter medium may be affected. As a result, a desired level of flux may not be secured.

Accordingly, in order to secure a sufficient channel and also ensure mechanical strength of the filter medium, when a basis weight of the first support 130, a basis weight of the second supports 121 and 122, and a basis weight of the nanofiber webs 111 and 112 are denoted by $a_1$, $b_1$, and $c_1$, respectively, the filter medium 1000 according to the present invention satisfies condition (1) below for a basis weight of each layer. When a thickness of the first support 130, a thickness of the second supports 121 and 122, and a thickness of the nanofiber webs 111 and 112 are denoted by $a_2$, $b_2$, and $c_2$, respectively, the filter medium 1000 according to the present invention satisfies condition (2) below for a thickness of each layer.

Condition (1) may be represented by $(b_1+c_1)/a_1 \leq 0.9$ and $c_1/b_1 \leq 2.1$ and preferably $0.06 \leq (b_1+c_1)/a_1 \leq 0.67$ and $0.02 \leq c_1/b_1 \leq 0.46$. Condition (2) may be represented by $(b_2+c_2)/a_2 23$ 0.32 and $c_2/b_2 \leq 2.1$ and preferably $0.027 \leq (b_2+c_2)/a_2 \leq 0.29$ and $0.0022 \leq c_2/b_2 \leq 1.1$.

In condition (1), when $(b_1+c_1)/z_1$ is greater than 0.9, it may be difficult to exhibit sufficient mechanical strength, an adhesion force between the first support 130 and the second supports 121 and 122 may be reduced, filtration efficiency and/or flux may be reduced, and differential pressure may be increased to make smooth backwashing difficult. In addition, in condition (1), when $c_1/b_1$ is greater than 2.1, an amount of fibers forming the second supports 121 and 122, which are distributed at interfaces formed between the second supports 121 and 122 and the nanofiber webs 111 and 112, may be small. Accordingly, a binding force between the nanofiber webs 111 and 112 and the second supports 121 and 122 may be lowered, an adhesion force with the first support 130 may be decreased, filtration efficiency and/or flux may be reduced, and differential pressure may be increased to make smooth backwashing difficult.

In condition (2), when $(b_2+c_2)/a_2$ is greater than 0.32, the filter medium 1000 may not have sufficient mechanical strength, and thus, it is difficult to perform backwashing, thereby shortening a replacement period of the filter medium 1000. In addition, differential pressure may be increased to make smooth backwashing difficult. When $(b_2+c_2)/a_2$ is greater than 0.32 and concurrently sufficient mechanical strength capable of withstanding backwashing is secured, a basis weight may be increased according to a decrease in thickness of the first support 130. Thus, a flow of a filtrate may be inhibited, and flux may be reduced, which is very undesirable. In addition, in condition (2), when $c_2/b_2$ is greater than 2.1, an adhesion force between the first support 130 and the second supports 121 and 122 and/or between the second supports 121 and 122 and the nanofiber webs 111 and 112 may be reduced. When $c_2/b_2$ is greater than 2.1 and concurrently sufficient mechanical strength capable of withstanding backwashing is secured, a basis weight of the second supports 121 and 122 may be increased. Thus, desired levels of filtration efficiency and/or flux may be difficult to obtain, backwashing durability may be reduced, and differential pressure may increase to make smooth backwashing difficult.

Meanwhile, the first support 130 and the second supports 121 and 122 may each independently include at least one selected from a nonwoven fabric, a fabric, and a knitted fabric to be described below. In this case, when average diameters of the fibers constituting the first support 130, the second supports 121 and 122, and the nanofiber webs 111 and 112 are denoted by $a_3$, $b_3$, and $c_3$, respectively, the filter medium 1000 according to the present invention may satisfy condition (3) below for a fiber average diameter of each layer.

Condition (3) may be represented by $(b_3+c_3)/a_3 \leq 6.4$ and $c_3/b_3 \leq 0.21$, and preferably $0.18 \leq (b_3+c_3)/a_3 \leq 1.4$ and $0.0037 \leq c_3/b_3 \leq 0.1$.

In condition (3), when $(b_3+c_3)/a_3$ is greater than 6.4, filtration efficiency and/or flux may be reduced, differential pressure may be increased to make smooth backwashing difficult, filterability as well as water permeability may be reduced due to a non-uniform pore distribution, and an adhesion force between layers may be lowered. When $c_3/b_3$ is greater than 0.21, filtration efficiency and/or flux may be reduced, differential pressure may be increased to make smooth backwashing difficult, and an adhesion force between the nanofiber web and the second support may be lowered.

Figure 2:
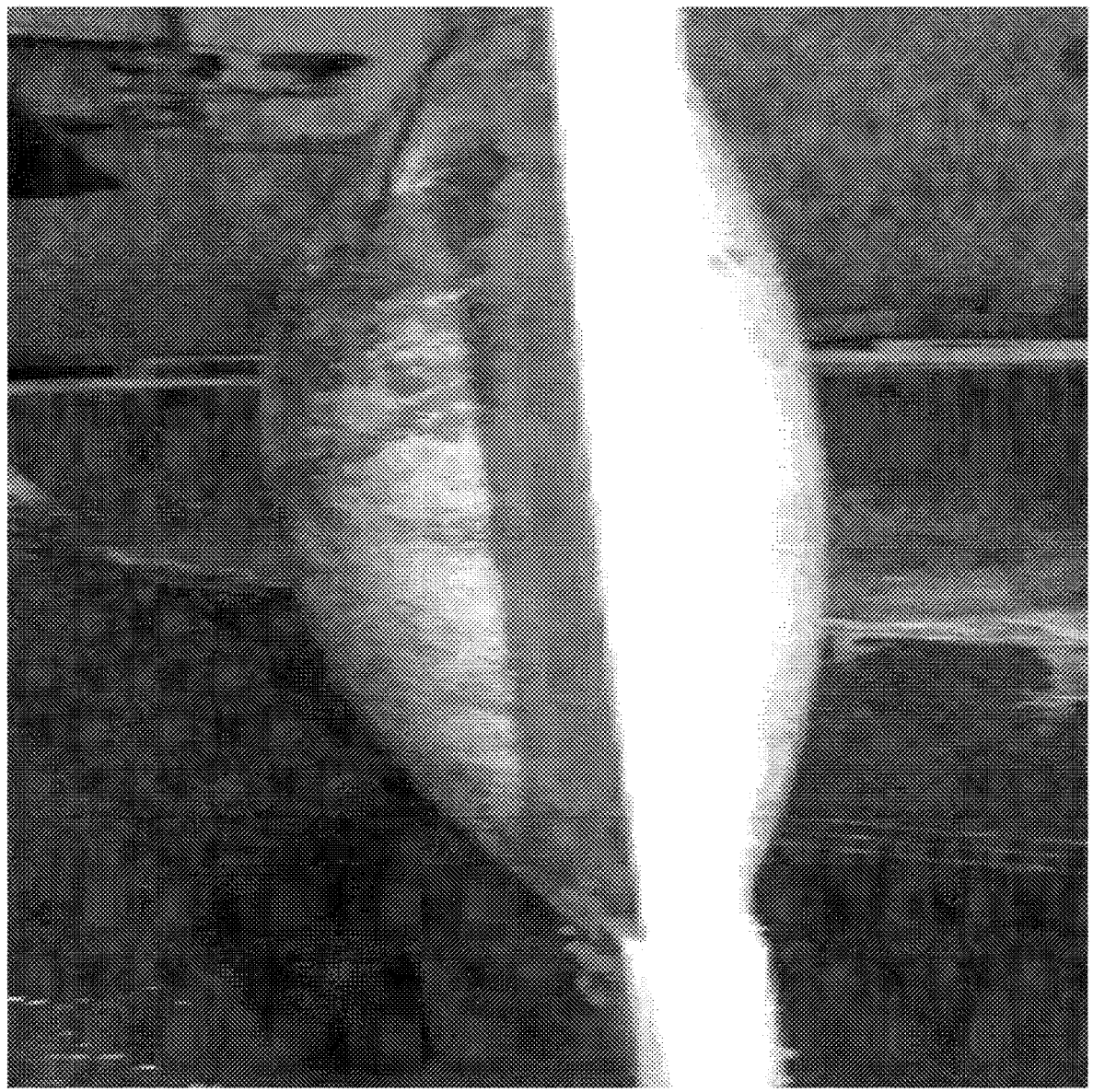
FIG. 2 is an image of a filter medium which swells due to a washing solution being trapped in the filter medium after delamination inside the filter medium in a backwashing process.

Meanwhile, when a binding force between the first support 130 and the nanofiber webs 111 and 112 functioning as media is weak, despite high mechanical strength, durability of the filter medium may be reduced due to backwashing. That is, high pressure applied during a backwashing process may accelerate interface separation between layers forming the filter medium. In this case, as shown in FIG. 2, a swelling phenomenon of a separation membrane may occur in the backwashing process, and thus, a function of the separation membrane may be significantly lowered or completely lost.

Therefore, a high adhesion force between the first support and the nanofiber web as the medium is very important in implementing a filter medium which exhibits sufficient durability even in frequent backwashing.

Generally, a method of bonding a support and a nanofiber web may be performed in such as manner that two layers may be bonded by using a separate adhesive material or fusing a low melting point component provided in the support to the nanofiber web. However, when the two layers are bonded using the separate adhesive material, an adhesive material may be dissolved by water to be treated, and consequently, a filtrate may be polluted and/or water permeability may be lowered. In a case in which a filter medium in which an adhesive material is partially dissolved is backwashed, a swelling phenomenon of the filter medium may occur or in a severe case, a nanofiber web may be peeled off, and thus, a function of the filter media may be completely lost.

Figure 3:
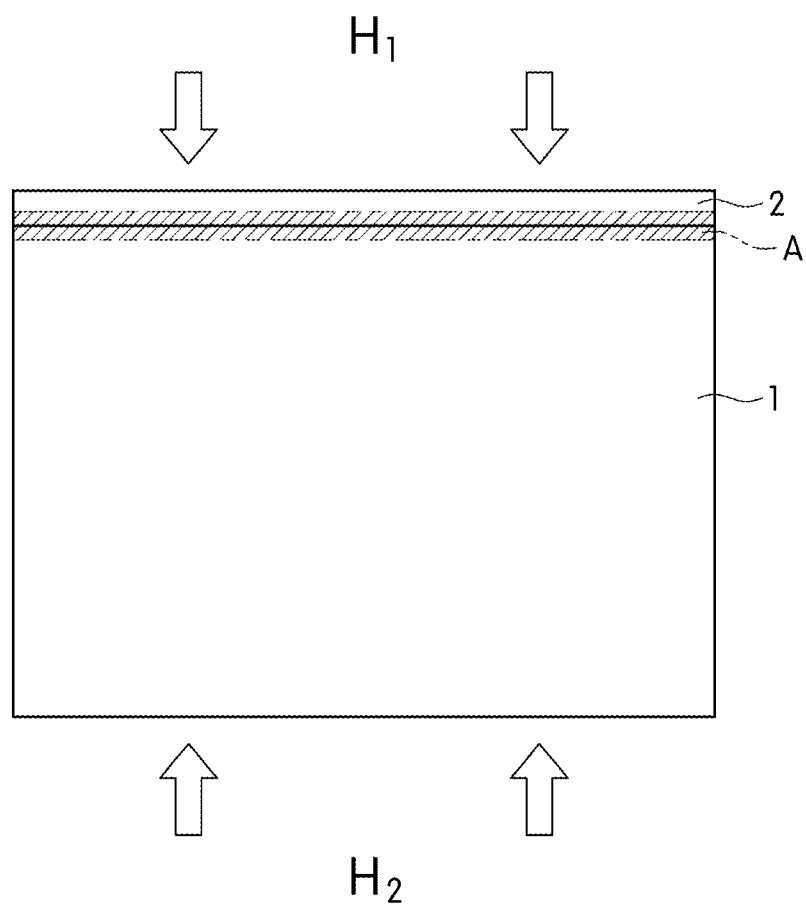
FIG. 3 is a schematic view illustrating that a first support and a nanofiber web are directed laminated.

Accordingly, a method may be adopted in which a nanofiber web and a support are bonded through fusion A. As shown in FIG. 3, a support 1 and a nanofiber web 2 which are stacked may be bonded by applying heat and/or pressure in both directions of the support 1 and the nanofiber web 2. However, when the support 1 and the nanofiber web 2 are bonded by applying heat and/or pressure, a point to be considered is to minimize physical and chemical deformation of the nanofiber web 2 functioning as a medium which is caused by the applied heat and pressure. When the nanofiber web is physically and chemically deformed, initially designed physical properties such as flux and a filtration rate of a filter medium may be changed.

When heat and/or pressure conditions are selected in a bonding process such that the nanofiber web 2 is not physically and chemically deformed, points to be considered may be material properties of the nanofiber web, such as a melting point, thermal conductivity, and heat capacity. Typically, a low melting point component of the support may be fused to the nanofiber web by applying a temperature greater than or equal to a melting point or concurrently applying a temperature greater than or equal to a melting point and pressure. Alternatively, the low melting point component of the support may be fused to the nanofiber web by applying high pressure although temperature is slightly lower than a melting point.

Meanwhile, a material forming the support or the nanofiber web is a polymer compound. Since the polymer compound has low thermal conductivity and very high heat capacity, as shown in FIG. 3, although certain heat H1 and certain heat H2 are applied in both directions, in order for the heat H1 and the heat H2 to reach an interface between the nanofiber web 2 and the support 1 to increase a temperature of the low melting point component provided in the support 1 to a melting point, the heat should be applied continuously for a long time. Furthermore, as shown in FIG. 3, when the support 1 is very thick, it may take a longer time for the heat H2 transferred from below to be transferred near the interface between the nanofiber web 2 and the support 1 to raise a temperature of the low melting point component provided in the support to a melting point, and it is necessary to apply more heat from below to shorten the time. However, when too much heat is applied from below, the low melting point component may be melted first below the first support, and the shape and structure of the support may be changed.

Alternatively, it is possible to solve a difficulty caused by the thickness of the support 1 by further increasing the heat H1 applied from above. However, in this case, physical/chemical deformation of the nanofiber web 2 may be caused, and initially designed physical properties of the filter medium may not be fully exhibited.

Accordingly, in the filter medium 1000 according to the exemplary embodiment of the present invention, the first support 130 and the nanofiber webs 111 and 112 may not be in direct contact with each other, and the second supports 121 and 122, which are thinner than the first support 130, may be interposed between the first support 130 and the nanofiber webs 111 and 112. As a result, an adhesion process between layers may be performed more stably and easily, a considerably high binding force may be exhibited at an interface between the layers, and interlayer delamination and peeling-off problems be minimized even when a high external force is applied due to backwashing or the like.

Figure 4A:
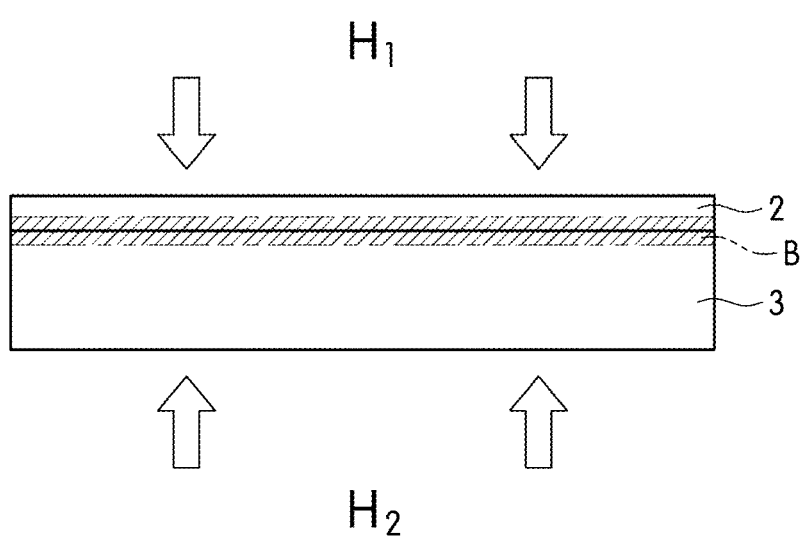
FIG. 4A is a view illustrating that a nanofiber web and a second support are laminated.
Figure 4B:
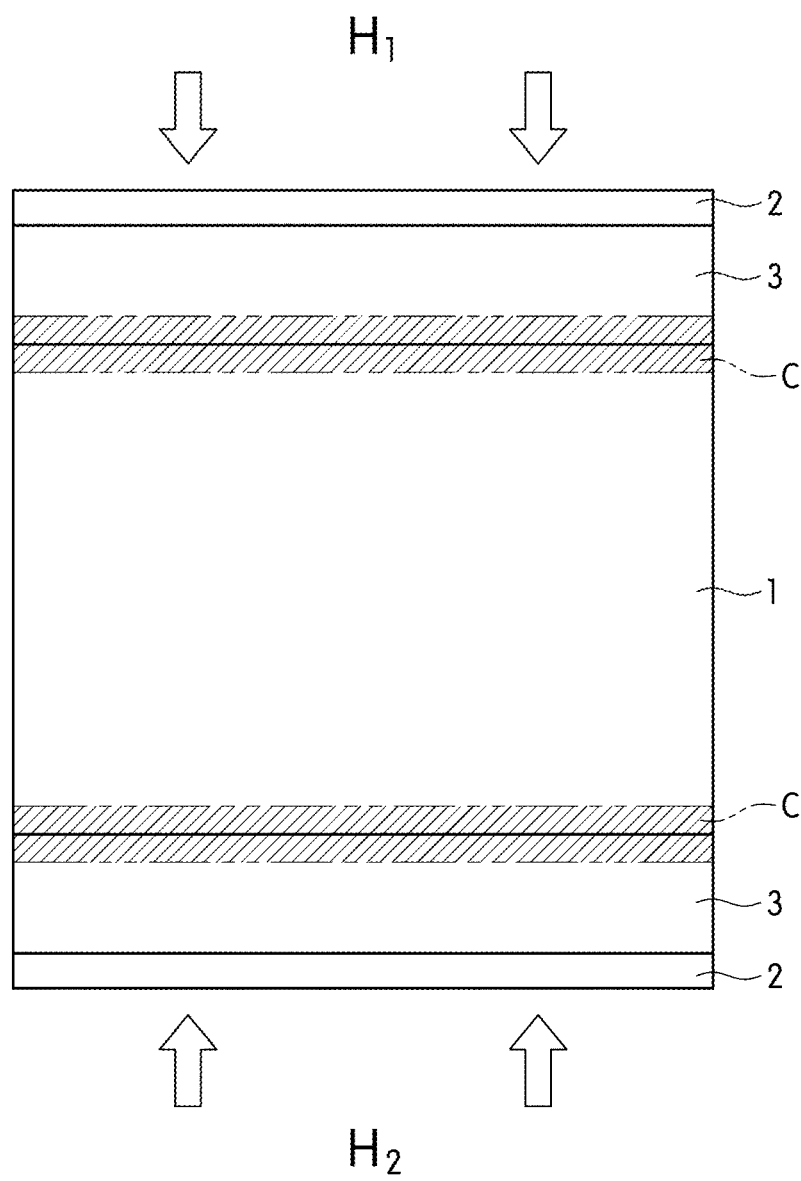
FIG. 4B is a view illustrating that the laminated nanofiber web and second support are disposed and laminated on each of both surfaces of a first support.

When this is described with reference to FIG. 4A, a thickness difference between a nanofiber web 2 and a second support 3 which satisfies condition (2) for the thickness is considerably decreased as compared with a thickness difference between the nanofiber web 2 and a first support 1, and thus, it is easier for heat H1 and heat H2 applied from above and below a stacked body of the nanofiber web 2/second support 3 to reach an interface between the nanofiber web 2 and the second support 3 to form a fusion portion B as compared with those of FIG. 3. In addition, since it is easier to control the amount and time of applied heat as compared with that of FIG. 3, it is advantageous to prevent physical/chemical deformation of the nanofiber web 2. Accordingly, as shown in FIG. 4A, when the nanofiber web 2 is bonded to the second support 3, nanofibers may be bonded to a support through a high adhesion force without a change in initially designed physical properties of the nanofiber web 2.

Hereinafter, each component provided in the filter medium 1000 will be described in detail.

First, the first support 130 supports the filter medium 1000, forms a large channel, and thus serves a function of more smoothly performing a filtration process or a backwashing process. Specifically, during the filtration process, when a pressure gradient is formed such that pressure inside the filter medium is lower than pressure outside the filter medium, the filter medium may be pressed. In this case, a channel, through which a filtrate flows in the filter medium, may be considerably decreased or blocked, and thus, greater differential pressure may be applied to the filter medium and concurrently flux may be considerably reduced. In addition, during the backwashing process, an external force for expanding the filter medium from an inner side to both outer sides of the filter medium may be applied, and when mechanical strength of the filter medium is low, the filter medium may be damaged due to the applied external force.

The first support 130 may be provided to prevent such problems occurring during the filtration process and/or backwashing process, may be used in a water treatment field, and may include a known porous member of which mechanical strength is secured. In an example, the first support may include a nonwoven fabric, a fabric, or a textile.

The fabric means that a fiber included in the fabric has longitudinal and transverse directionalities. A specific structure of the fabric may be a plain weave, a twilled weave, or the like, and density of warp yarn and weft yarn is not particularly limited. In addition, the knitted fabric may have a known knit structure and may be a weft knitted fabric, a warp knitted fabric, or the like. In an example, the raw fabric may be a tricot in which yarn is warp knitted. Furthermore, as shown in FIG. 1, the first support 130 may include a nonwoven fabric in which the first composite fiber 130a has no longitudinal or transverse directionality. The first support 130 may use a known nonwoven fabric manufactured through various methods, such as a dry nonwoven fabric such as a chemical bonding nonwoven fabric, a thermal bonding nonwoven fabric, or an airlaid nonwoven fabric, a wet nonwoven fabric, a spunless nonwoven fabric, a needle punching nonwoven fabric, or a meltblown nonwoven fabric.

The first support 130 has a thickness that satisfies condition (2) in order to exhibit sufficient mechanical strength as described above. In an example, the first support 130 may have a thickness ranging from 2 mm to 8 mm, more preferably ranging from 2 mm to 5 mm, and still more preferably ranging from 3 mm to 5 mm. When the thickness is less than 2 mm, the first support 130 may not exhibit sufficient mechanical strength capable of withstanding frequent backwashing. In addition, when the thickness is greater than 8 mm and when the filter medium is implemented as a filter unit to be described below and then a plurality of filter units are implemented as a filter module having a limited space, a degree of integration of the filter medium per unit volume of the module may be reduced, and differential pressure may be increased to make smooth backwashing difficult.

The first support 130 may have a basis weight preferably ranging from 250 g/m² to 800 g/m² and more preferably ranging from 350 g/m² to 600 g/m² so as to concurrently satisfy condition (1) for the basis weight and condition (2) for the thickness as described above. When the basis weight is less than 250 g/m², it may be difficult to exhibit sufficient mechanical strength, and an adhesion force with the second support may be reduced. When the basis weight is greater than 800 g/m², a sufficient channel may not be formed to reduce flux, and differential pressure may be increased to make smooth backwashing difficult.

In addition, when the first support 130 is composed of a fiber like a nonwoven fabric, the fiber may have an average diameter ranging from 5 μm to 50 μm and preferably ranging from 20 μm to 50 μm so as to satisfy condition (3) for the fiber average diameter as described above. When the fiber average diameter of the first support 130 is less than 5 μm, flux may be reduced, and differential pressure may be increased to make smooth backwashing difficult. When the fiber average diameter is greater than 50 μm, it may be difficult to exhibit sufficient mechanical strength, filtration efficiency may be lowered, and an adhesion force with the second support may be reduced.

In addition, the first support 130 may have an average pore size ranging from 20 μm to 200 μm and a porosity ranging from 50% to 90%, but the present invention is not limited thereto. There are no restriction on porosity and pore size as long as the first support 130 has a degree of the porosity and pore size so as to support the nanofiber webs 111 and 112 to be described below to exhibit a desired level of mechanical strength and concurrently to smoothly form a channel even at high pressure in the filtration process and/or backwashing process.

A material of the first support 130 is not limited as long as the material is used as a support of a separation membrane. A non-limiting example of the first support 130 may include a synthetic polymer component selected from the group consisting of polyester-based, polyurethane-based, polyolefin-based, and polyamide-based polymer components, or a natural polymer component including a cellulose-based polymer component. However, when the first support has very brittle physical properties, it may be difficult to expect a desired level of binding force in a process of laminating the first support and the second support. This is because, unlike a film, the first support may not have a smooth surface but may have a macroscopic uneven surface when pores are formed, and like a nonwoven fabric, a surface composed of fibers may not be smooth according to an arrangement of the fibers, a fineness of the fiber, and the like and a degree of unevenness may also be different for each location. In a state in which there exist portions that are not in close contact with an interface between two layers to be laminated, when the remaining portions are bonded, delamination may start due to the portions that are not in close contact with the interface. In order to solve such a problem, it is necessary to perform a lamination process in a state in which a contact extent between two layers is increased by applying pressure in both directions of the two layers. Even when pressure is applied to a support having very brittle physical properties, there may be a limitation in increasing adhesion of an interface between the two layers, and when higher pressure is applied, the support may be damaged. Accordingly, a material having high flexibility and elongation may be suitable as a material of the first support, and preferably, the first support may include a polyolefin-based material so as to have excellent adhesion with the second supports 121 and 122.

Meanwhile, the first support 130 may include a low melting point component so as to be bonded with the second supports 121 and 122 without a separate adhesive or adhesive layer. When the first support 130 includes a fabric such as a nonwoven fabric, the first support 130 may be composed of the first composite fiber 130a including a low melting point component. The first composite fiber 130a may include a support component and the low melting point component and may be disposed such that at least a portion of the low melting point component is exposed at an external surface thereof. In an example, the first composite fiber 130a may be a sheath-core type composite fiber in which a support component forms a core portion and a low melting point component forms a sheath portion surrounding the core portion, or a side-by side composite fiber in which a low melting point component is disposed on one side of a support component as described above. The low melting point component and the support component may preferably be polyolefin-based components in view of flexibility and elongation of a support. For example, the support component may be polypropylene, and the low melting component may be polyethylene. The low melting point component may have a melting point ranging from 60° C. to 180° C.

Next, the second supports 121 and 122 disposed on both surfaces of the above-described first support 130 will be described.

The second supports 121 and 122 support the nanofiber webs 111 and 112 to be described below and serve a function of increasing an adhesion force of each layer provided in the filter medium.

The second supports 121 and 122 are not particularly limited as long as the second supports 121 and 122 generally serve as a support of the filter medium. The shape of the second supports 121 and 122 may be a shape of a fabric, a knitted fabric, or a nonwoven fabric. The fabric means that a fiber included in the fabric has longitudinal and transverse directionalities. A specific structure of the fabric may be a plain weave, a twilled weave, or the like, and density of warp yarn and weft yarn is not particularly limited. In addition, the knitted fabric may have a known knit structure and may be a weft knitted fabric, a warp knitted fabric, or the like, but the present invention is not particularly limited thereto. Furthermore, the nonwoven fabric means that a fiber included in the nonwoven fabric has no longitudinal or transverse directionality. The nonwoven fabric may use a nonwoven fabric manufactured through a known method, such as a dry nonwoven fabric such as a chemical bonding nonwoven fabric, a thermal bonding nonwoven fabric, or an airlaid nonwoven fabric, a wet nonwoven fabric, a spunless nonwoven fabric, a needle punching nonwoven fabric, or a meltblown nonwoven fabric.

The second supports 121 and 122 may include, for example, a nonwoven fabric. In this case, a fiber forming the second supports 121 and 122 may have an average diameter ranging from 5 μm to 30 μm and preferably ranging from 10 μm to 250 μm so as to satisfy condition (3) for the fiber average diameter as described above. When the fiber average diameter of the second supports 121 and 122 is less than 5 μm, flux may be reduced, and differential pressure may be increased to make smooth backwashing difficult. When the fiber average diameter is greater than 30 μm, filtration efficiency may be lowered, and an adhesion force with the first support and the nanofiber web may be reduced.

In addition, the second supports 121 and 122 may have a thickness ranging from 100 μm to 400 μm, more preferably ranging from 150 μm to 400 μm, and still more preferably ranging from 150 μm to 250 μm so as to satisfy condition (2) for the thickness as described above. In an example, the second supports 121 and 122 may have a thickness of 200 μm. When the thickness of the second supports 121 and 122 is less than 100 μm, filtration efficiency and backwashing durability may be lowered. When the thickness is greater than 400 μm, differential pressure may be increased to make smooth backwashing difficult.

In addition, the second supports 121 and 122 may have an average pore size of 20 μm to 100 μm and a porosity of 50% to 90%. However, the present invention is not limited thereto, and there are no restrictions on porosity and pore size as long as the second supports 121 and 122 have a degree of the porosity and pore size so as to support the nanofiber webs 111 and 112 to be described below to exhibit a desired level of mechanical strength and so as not to inhibit a flow of a filtrate introduced through the nanofiber webs 111 and 112 at the same time.

In addition, the second supports 121 and 122 may have a basis weight ranging from 10 $g/m^2$ to 200 $g/m^2$, more preferably ranging from 35 $g/m^2$ to 200 $g/m^2$, and still more preferably ranging from 35 $g/m^2$ to 80 $g/m^2$ so as to satisfy condition (1) for the basis weight as described above. In an example, the second supports 121 and 122 may have a basis weigh of 40 $g/m^2$. In addition, when the basis weight is less than 10 $g/m^2$, filtration efficiency may be lowered and an amount of fibers forming the second supports 121 and 122, which are distributed at interfaces formed between the second supports 121 and 122 and the nanofiber webs 111 and 112 to be described below, may be small. Accordingly, an effective adhesion area of the second support in contact with the nanofiber web may be reduced so that it may not be possible to exhibit a desired level of binding force. In addition, it may not be possible to exhibit sufficient mechanical strength capable of supporting the nanofiber web, and an adhesion force with the first support may be reduced. In addition, when the basis weight is greater than 200 $g/m^2$, it may be difficult to secure a desired level of flux, and differential pressure may be increased to make smooth backwashing difficult.

A material of the second supports 121 ad 122 is not limited as long as the material is used as a support of a filter medium. A non-limiting example of the second supports 121 and 122 may include a synthetic polymer component selected from the group consisting of polyester-based, polyurethane-based, polyolefin-based, and polyamide-based polymer components, or a natural polymer component including a cellulose-based polymer component.

However, the second supports 121 and 122 may include a polyolefin-based polymer component so as to improve adhesion with the nanofiber webs 111 and 112 to be described below and the first support 130 described above. In addition, when the second supports 121 and 122 include a fabric such as a nonwoven fabric, the second supports 121 and 122 may be composed of a second composite fiber 121a including a low melting point component. The second composite fiber 121a may include a support component and a low melting point component and may be disposed such that at least a portion of the low melting point component is exposed at an external surface thereof. In an example, the second composite fiber 121a may be a sheath-core type composite fiber in which a support component forms a core portion and a low melting point component forms a sheath portion surrounding the core portion, or a side-by side composite fiber in which a low melting point component is disposed on one side of a support component. The low melting point component and the support component may be polyolefin-based components in view of flexibility and elongation of a support as described above. For example, the support component may be polypropylene, and the low melting component may be polyethylene. The low melting point component may have a melting point ranging from 60° C. to 180° C.

When the above-described first support 130 is implemented using the first composite fiber 130a including the low melting point component so as to exhibit more improved binding force with the second supports 121 and 122, the low melting point component of the first composite fiber 130a and the low melting point component of the second composite fiber 121a may be fused at an interface between the first support 130 and the second support 121, thereby forming a more stronger fusion portion. In this case, the first composite fiber 130a and the second composite fiber 121a may be made of the same material in terms of compatibility.

Next, the nanofiber webs 111 and 112 disposed on one surfaces of the above-described second supports 121 and 122 will be described. The nanofiber webs 111 and 112 may have a three-dimensional network structure in which one strand or a plurality of strands of nanofibers are randomly and three-dimensionally stacked (see FIG. 5).

The nanofiber forming the nanofiber web may be made of a known fiber-forming component. However, the nanofiber may preferably include a fluorine-based compound as a fiber-forming component so as to exhibit more improved chemical resistance and heat resistance. As a result, there is an advantage in that, even when water to be treated is a strong acid/strong base solution or a high temperature solution, filtration efficiency and flux may be secured to a desired level without changing physical properties of a filter medium and the filter medium may have a long life cycle. The fluorine-based compound may be used without limitation as long as the fluorine-based compound is a known fluorine-based compound capable of being formed into a nanofiber. In an example, the fluorine-based compound may include at least one compound selected from the group consisting of polytetrafluoroethylene (PTFE)-based, tetrafluoroethylene-perfluoroalkyl vinyl ether (PFA) copolymer-based, tetrafluoroethylene-hexafluoropropylene (FEP) copolymer-based, tetrafluoroethylene-hexafluoropropylene-perfluoroalkyl vinyl ether (EPE) copolymer-based, tetrafluoroethylene-ethylene (ETFE) copolymer-based, polychlorotrifluoroethylene (PCTFE)-based, chlorotrifluoroethylene-ethylene (ECTFE) copolymer-based, and polyvinylidene fluoride (PVDF)-based compounds. More preferably, the fluorine-based compound may be PVDF in terms of a low production unit cost, ease of mass production of a nanofiber through electrospinning, and high mechanical strength and chemical resistance. In this case, when the nanofiber includes PVDF as a fiber-forming component, a weight average molecular weight of the PVDF may be in a range of 10,000 to 1,000,000 and preferably in a range of 300,000 to 600,000, but the present invention is not limited thereto.

In addition, the nanofiber may have a fiber average diameter ranging from 0.05 μm to 1 μm and preferably ranging from 0.1 μm to 0.9 μm so as to satisfy condition (3) for the fiber average diameter as described above. When the fiber average diameter of the nanofiber is less than 0.05 μm, flux may be reduced, and differential pressure may be increased to make smooth backwashing difficult. When the fiber average diameter of the nanofiber is greater than 1 μm, a binding force with the second support may be lowered, and filtration efficiency may be lowered.

Meanwhile, the nanofiber provided in the nanofiber webs 111 and 112 may include 35 wt % of a first nanofiber group with a diameter ranging from 0.1 μm to 0.2 μm, 53 wt % of a second nanofiber group with a diameter ranging from 0.2 μm to 0.3 μm, and 12 wt % of a third nanofiber group with a diameter ranging from 0.3 μm to 0.4 μm with respect to the total weight of the nanofiber web 111, but the present invention is not limited thereto. In addition, the nanofiber may have an aspect ratio ranging from 1,000 to 100,000, but the present invention is not limited thereto.

The nanofiber webs 111 and 112 may have a thickness ranging from 0.5 μm to 200 μm and preferably ranging from 1 μm to 150 so as to satisfy condition (2) for the thickness as described above. In an example, the nanofiber webs 111 and 112 may have a thickness of 20 μm. When the thickness of the nanofiber webs 111 and 12 is less than 0.5 μm, filtration efficiency and/or backwashing durability may be lowered. When the thickness is greater than 200 μm, differential pressure may be increased to make smooth backwashing difficult.

The nanofiber webs 111 and 112 may have a porosity ranging from 40% to 90% and more preferably ranging from 60% to 90%. In addition, the nanofiber webs 111 and 112 may have an average pore size ranging from 0.1 μm to 5 μm and more preferably ranging from 0.1 μm to 3 μm, for example, may have an average pore size of 0.25 μm.

The nanofiber webs 111 and 112 may have a basis weight ranging from 0.05 g/m² to 20 g/m² and preferably ranging from 5 g/m² to 15 g/m², for example, a basis weight of 10 g/m² so as to satisfy condition (1) for the basis weight as described above. When the basis weight of the nanofiber webs is less than 0.05 g/m², filtration efficiency may be lowered and an adhesion force with the second support may be reduced to lower backwashing durability. When the basis weight is greater than 20 g/m², it may be difficult to secure a desired level of flux, and differential pressure may be increased to make smooth backwashing difficult.

In addition, the nanofiber webs 111 and 112 may be provided as one or more layers in the filter medium 100, and in this case, the nanofiber webs may differ in porosity, pore size, basis weight and/or thickness.

Meanwhile, the nanofibers forming the nanofiber webs 111 and 112 may be modified so as to increase hydrophilicity. In an example, a hydrophilic coating layer may be further provided on at least a portion of an outer surface of a nanofiber. As described above, when the nanofiber includes a fluorine-based compound, the fluorine-based compound may have strong hydrophobicity, and thus, flux may be reduced when a filtrate to be filtered is a hydrophilic solution. Therefore, the hydrophilic coating layer may be further provided on a surface of the nanofiber with hydrophobicity, and the hydrophilic coating layer may be a known one. In an example, the hydrophilic coating layer may be formed to include a hydrophilic polymer including a hydroxyl group or may be formed by cross-linking the hydrophilic polymer using a cross-linking agent. In an example, the hydrophilic polymer may be in the form of one or a mixture of polyvinyl alcohol (PVA), ethylenevinyl alcohol (EVOH), sodium alginate, and the like, and most preferably, may be PVA. In addition, the cross-linking agent may be used without limitation as long as the cross-linking agent is a known cross-linking agent including a functional group capable of being cross-linked with the hydroxyl group included in the hydrophilic polymer through a condensation reaction or the like. For example, the functional group may be a hydroxyl group, a carboxyl group, or the like.

In order to exhibit more improved physical properties, the hydrophilic coating layer may be formed by cross-linking a cross-linking agent including PVA and a carboxyl group. In this case, the PVA may have a polymerization degree ranging from 500 to 2,000 and a saponification degree ranging from 85% to 90%. When the polymerization degree of the PVA is excessively low, the formation of the hydrophilic coating layer may not be smooth, and even though the hydrophilic coating layer is formed, the hydrophilic coating layer may be easily peeled off, and hydrophilicity may not be improved to a desired level. In addition, when the polymerization degree is too high, the formation of the hydrophilic coating layer may be excessive. Thus, a pore structure of the nanofiber web may be changed, or pores may be clogged. In addition, when the saponification degree is too low, it may be difficult to improve hydrophilicity.

The cross-linking agent may be a component including a carboxyl group so as to be cross-linked with the above-described PVA. In an example, the cross-linking agent may include at least one material selected from the group consisting of poly(acrylic acid-maleic acid), a polyacrylic acid, and poly(styrenesulfonic acid-maleic acid). Furthermore, the cross-linking agent may be a polyfunctional cross-linking agent including at least three carboxyl groups so as to be coated very thinly for more improved coating and adhesive properties on hydrophobic surfaces of the nanofibers and for no change in a pore structure of the nanofiber webs 111 and 112, and so as to concurrently exhibit more improved flux. When the number of the carboxyl groups included in the cross-linking agent is less than 3, it is difficult for a coating layer to be formed on the hydrophobic surfaces of the nanofibers, and even though the coating layer is formed, an adhesion force may be very weak so that the coating layer may be easily peeled off. In an example, the cross-linking agent including at least three carboxyl groups may be poly(acrylic acid-maleic acid).

The hydrophilic coating layer may be formed by cross-linking 2 to 20 parts by weight of a cross-linking agent including a carboxyl group with respect to 100 parts by weight of the above-described PVA. When the cross-linking agent is included in an amount less than 2 parts by weight, the formability of a hydrophilic coating layer may be decreased, and chemical resistance and mechanical strength may be lowered. In addition, when the cross-linking agent is included in an amount exceeding 20 parts by weight, flux may be reduced because pores are decreased due to the coating layer.

Meanwhile, the hydrophilic coating layer may be formed on a portion or all of the outer surface of the nanofiber. Here, the nanofiber may be coated with the hydrophilic coating layer such that the hydrophilic coating layer is included in an amount of 0.1 g to 2 g per unit area (m$^2$) of the nanofiber web.

As described above, a wetting angle may be less than or equal to 30°, more preferably less than or equal to 20°, still more preferably less than or equal to 12°, and yet still more preferably less than or equal to 5° on a surface of each of the nanofiber webs 111 and 112 modified so as to include the hydrophilic coating layer. As a result, although the nanofiber webs are implemented using the nanofiber, that is, a hydrophobic material, improved flux may be secured.

The above-described filter medium 1000 may be manufactured through a manufacturing method to be described below, but the present invention is not limited thereto.

The filter medium 1000 according to the present invention may be manufactured through a method including (1) laminating a nanofiber web and a second support and (2) disposing the laminated nanofiber web and second support on each of both surfaces of a first support such that the second support is in contact with the first support and performing laminating thereon.

First, as operation (1) according to the present invention, an operation of laminating the nanofiber web and the second support is performed.

In the case of the nanofiber web, a method of providing a nanofiber to form a fiber web having a three-dimensional network shape may be used without limitation.

The nanofiber web may be preferably formed by electrospinning a spinning solution including a fluorine-based compound on the second support.

In an example, the spinning solution may include a fluorine-based compound as a fiber-forming component and a solvent. The fluorine-based compound may be included in an amount of 5 wt % to 30 wt % and preferably in an amount of 8 wt % to 20 wt % in the spinning solution. When the fluorine-based compound is included in an amount less than 5 wt %, it may be difficult for the spinning solution to be formed into a fiber, and the spinning solution may not be spun into a fibrous phase and may be spun in a droplet state to form a film phase, or even though spinning is performed, many beads may be formed and a solvent may not be volatized easily. Thus, pores may be clogged in a calendering process to be described below. In addition, when the fluorine-based compound is included in an amount exceeding 30 wt %, viscosity is increased to cause solidification on a surface of a solution, and thus, it may be difficult to perform spinning for a long time. In addition, a fiber diameter may be increased, and thus, a fibrous phase with a sub-micrometer size or less may not be formed.

The solvent may be used without limitation as long as the solvent does not form a precipitate while dissolving the fiber-forming component, i.e., the fluorine-based compound and does not affect spinnability of a nanofiber to be described below. Preferably, the solvent may include at least one selected from the group consisting of γ-butyrolactone, cyclohexanone, 3-hexanone, 3-heptanone, 3-octanone, N-methylpyrrolidone, acetone, dimethylacetamide, dimethyl sulfoxide and dimethylformamide. In an example, the solvent may be a mixed solvent of dimethylacetamide and acetone.

The prepared spinning solution may be prepared into a nanofiber through a known electrospinning device and method. In an example, the electrospinning device may be an electrospinning device including a single spin pack with one spin nozzle or may be an electrospinning device including a plurality of single spin packs or a spin pack with a plurality of nozzles for mass production. In addition, in an electrospinning process, dry spinning or wet spinning with an external coagulation bath may be used, and the method is not limited.

When a stirred spinning solution is introduced into the electrospinning device, and is electrospun on a collector, for example, a paper, a nanofiber web composed of a nanofiber may be obtained. As a specific condition for the electrospinning, for example, air pressure of air sprayed through an air spray nozzle provided in a nozzle of a spin pack may be set to be in a range of 0.01 MPa to 0.2 MPa. When the air pressure is less than 0.01 MPa, the air pressure may not contribute to collection and accumulation of the nanofiber. When the air pressure is greater than 0.2 MPa, a cone of the spin nozzle is hardened to generate blocking of needles, thereby resulting in spinning trouble. In addition, when the spinning solution is spun, an injection rate of the spinning solution per nozzle may be in a range of 10 μl/min to 30 μl/min. Further, a distance between a tip of the nozzle and the collector may be in a range of 10 cm to 30 cm. However, the present invention is not limited thereto, and the injection rate and the distance may be changed according to a purpose.

Alternatively, a nanofiber may be directly electrospun on the above-described second support to directly form a nanofiber web on the second support. The nanofiber accumulated/collected on the second support may have a three-dimensional network structure. Heat and/or pressure are further applied to the accumulated/collected nanofiber so as to have a porosity, pore size, and basis weight suitable for exhibiting desired water permeability and filtration efficiency of a separation membrane, thereby implementing the nanofiber into a nanofiber web having a three-dimensional network structure. A known method may be adopted as a specific method of applying the heat and/or pressure, and as a non-limiting example thereof, a common calendering process may be used. In this case, the applied heat may have a temperature ranging 70° C. to 190° C. Furthermore, when the calendering process is performed, the calendering process may be performed multiple times. For example, a drying process for partially or entirely removing a solvent and moisture, which remain in the nanofiber through primary calendering, may be performed and then, secondary calendering may be performed to control porosity and improve strength. Here, a degree of heat and/or pressure applied in each calendering process may be the same or different.

On the other hand, when the second support is implemented using a low melting point composite fiber, bonding between the nanofiber web and the second support through thermal fusion may be concurrently performed through the calendering process.

In addition, a separate hot melt powder or a hot melt web may be further interposed to bond the second support and the nanofiber web. In this case, a temperature of the applied heat may be in a range of 60° C. and 190° C., and the pressure may be applied in a range of 0.1 kgf/cm$^2$ to 10 kgf/cm$^2$, but the present invention is not limited thereto. Components such as the hot melt powder separately added for the bonding may form a fumed or may be melted in a process of laminating the supports or the support and the nanofiber web, and thus, pores may be frequently clogged. Accordingly, initially designed flux of a filter medium may not be achieved. In addition, the components may be dissolved in a water treatment process to cause negative environmental problems so that it is preferable that the second support and the nanofiber web are bonded without adding the components.

Figure 6:
FIG. 6 is a SEM image of a cross section of a second support which includes a nanofiber web on one surface thereof and is included in an embodiment of the present invention.

The second support, in which the nanofiber web is laminated and provided on one surface of the second support by performing operation (1), may have a thickness of about 173±7 μm as shown in FIG. 6. In this case, a scale bar of FIG. 6 may have a size of 10 μm.

Next, before operation (2) to be described below is performed, an operation of treating the nanofiber web with a hydrophilic coating layer-forming composition to form a hydrophilic coating layer may be further performed.

Specifically, the present operation may include treating the nanofiber web with the hydrophilic coating layer-forming composition and heat-treating the hydrophilic coating layer-forming composition to form the hydrophilic coating layer.

First, the hydrophilic coating layer-forming composition may include a hydrophilic component and a cross-linkable component. In an example, the hydrophilic coating layer-forming composition may include PVA, a cross-linking agent including a carboxyl group, and a solvent, i.e., water for dissolving the PVA and the cross-linking agent. The hydrophilic coating layer-forming composition may include 2 to 20 parts by weight of the cross-linking agent and 1,000 to 100,000 parts by weight of the solvent with respect to 100 parts by weight of the PVA.

Meanwhile, when the nanofiber forming the prepared nanofiber web includes a fluorine-based compound, the fluorine-based compound may have strong hydrophobicity, and thus, even though the nanofiber web is treated with the above-described hydrophilic coating layer-forming composition, a coating layer may not be properly formed on a surface of the nanofiber web. Therefore, in order to wet the hydrophilic coating layer-forming composition in an outer surface of the nanofiber, the hydrophilic coating layer-forming composition may further include a wettability enhancer.

Any component may be used as the wettability enhancer without limitation as long as the component may improve the wettability of a hydrophobic outer surface of a nanofiber with respect to a hydrophilic solution and concurrently may be dissolved in the hydrophilic coating layer-forming composition. In an example, the wettability enhancer may include at least one component selected from the group consisting of isopropyl alcohol, ethyl alcohol, and methyl alcohol. Furthermore, the wettability enhancer may be included in an amount of 1,000 to 100,000 parts by weight with respect to 100 parts by weight of the PVA included in the hydrophilic coating layer-forming composition. When the wettability enhancer is included in an amount less than 1,000 parts by weight, the improvement of the wettability of the nanofiber is insignificant, and thus, the formation of the hydrophilic coating layer may not be smooth, and the hydrophilic coating layer may be frequently peeled off. In addition, when the wettability enhancer is included in an amount exceeding 100,000 parts by weight, a degree of improvement of the wettability may be insignificant, and concentrations of the PVA and the cross-linking agent included in the hydrophilic coating layer-forming composition are decreased so that the formation of the hydrophilic coating layer may not be smooth.

Meanwhile, a hydrophilic coating layer may be formed by pre-treating the nanofiber web with a wettability enhancer and then treating the nanofiber web with a hydrophilic coating layer-forming composition without providing the wettability enhancer in the hydrophilic coating layer-forming composition. However, when a nanofiber web in which a wettability enhancer is supported in pores is immersed in a hydrophilic coating layer-forming composition, a time taken for the wettability enhancer supported in the pores to escape from the nanofiber web and for the hydrophilic coating layer-forming composition to permeate the pores at the same time may be long, and thus a manufacturing time may be prolonged. In addition, since a degree of permeation of the hydrophilic coating layer-forming composition differs according to a thickness and a pore size of the nanofiber web, a hydrophilic coating layer may be non-uniformly formed according to positions of a fiber web. Furthermore, as the hydrophilic coating layer is non-uniformly formed, the pores may be clogged in a portion of the nanofiber web by the hydrophilic coating layer. In this case, an initially designed pore structure of the nanofiber web may be changed, and thus, desired flux may not be obtained. Therefore, when the wettability enhancer is provided in the hydrophilic coating layer-forming composition, it is advantageous in concurrently achieving a reduction in manufacturing time, simplification of a manufacturing process, and improvement in the formability of the hydrophilic coating layer without changing the pore structure of the nanofiber web.

Any known coating method may be used without limitation as a method of forming the above-described hydrophilic coating layer-forming composition on the nanofiber web, and for example, immersion, spraying or the like may be used.

Next, an operation of heat-treating the hydrophilic coating layer-forming composition treated on the nanofiber web to form the hydrophilic coating layer may be performed. A process of drying a solvent of the hydrophilic coating layer-forming composition may be concurrently formed through the heat-treating. The heat-treating may be performed in a dryer. In this case, a temperature of applied heat may be in a range of 80° C. to 160° C., and a treatment time may be in a range of 1 minute to 60 minutes, but the present invention is not limited thereto.

Next, as operation (2) according to the present invention, an operation of disposing the laminated nanofiber web and second support on each of the both surfaces of the first support such that the second support is in contact with the first support and performing laminating thereon is performed.

Operation (2) may include 2-1) stacking the second support and the nanofiber web laminated in operation (1) on each of the both surfaces of the first support and 2-2) fusing the first support and the second support by applying at least one of heat and pressure.

A known method may be adopted as a specific method of applying the heat and/or pressure in operation 2-2), and as a non-limiting example thereof, a common calendering process may be used. In this case, a temperature of the applied heat may be in a range of 70° C. to 190° C. Furthermore, when the calendering process is performed, the calendering process may be performed multiple times. For example, primary calendering may be performed, and then, secondary calendering may be performed. Here, a degree of heat and/or pressure applied in each calendering process may be the same or different. In operation 2-2), the second support and the first support may be bonded through thermal fusion, and thus, there may be an advantage in that a separate adhesive or adhesive layer may be omitted.

The present invention includes a filter unit implemented to include the filter medium manufactured through the above-described manufacturing method.

Figure 7A:
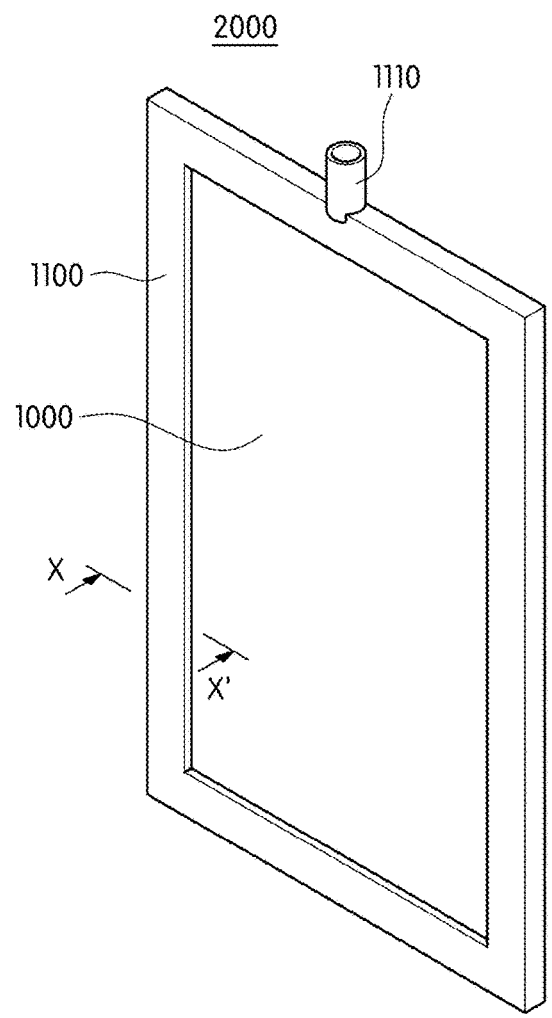
FIG. 7A is a perspective view illustrating the filter unit.

As shown in FIG. 7A, the filter medium 1000 may be implemented as a flat filter unit 2000. Specifically, the flat filter unit 2000 includes the filter medium 1000 and a support frame 1100 configured to support an edge of the filter medium 1000. An inlet port 1110 may be provided in any one region of the support frame 1100 to allow a pressure difference between the outside and the inside of the filter medium 1000 to be gradient. In addition, a channel may be formed in the support frame 1100 to allow a filtrate filtered in the nanofiber webs 101 and 102 to be discharged to the outside via a support body 200 in which the second support and the first support are stacked in the filter medium 1000.

Figure 7B:
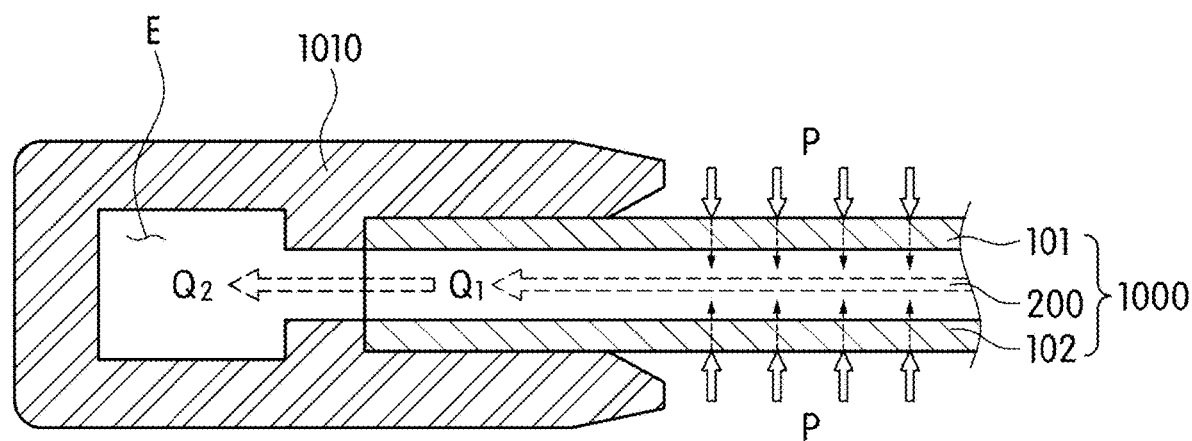
FIG. 7B is a schematic view illustrating a filtration flow on the basis of a cross-sectional view taken along boundary line X-X' of FIG. 7A.

Specifically, when the filter unit 2000 shown in FIG. 7A is applied with a high pressure suction force through the inlet port 1110, a filtrate P to be filtered, which is disposed outside the filter medium 1000, flows toward the inside of the filter medium 1000, as shown in FIG. 7B, a filtrate Q1 filtered through the nanofiber webs 101 and 102 flows along a channel formed through the support body 200 formed by stacking the second support and the first support and then is introduced into a channel E provided in the support frame 1100. Then, an introduced filtrate Q2 may be discharged to the outside through the inlet port 1110.

In addition, a plurality of flat filter units 2000 as shown in FIG. 7A may be provided so as to be spaced a certain interval apart from each other in one outer case to implement a filter module. A plurality of such filter modules may be stacked and formed into blocks again to form a large water treatment apparatus.

MODE OF THE INVENTION

The present invention will be described in more detail through the following examples, but the following examples do not limit the scope of the present invention, and it should be understood that the following examples are intended to assist the understanding of the present invention.

Preparation Example: Hydrophilic Coating Layer-Forming Composition 7,142 parts by weight of ultrapure water was mixed with respect to 100 parts by weight of PVA (PVA217 manufactured by Kuraray Co.) as a hydrophilic component, and then, the PVA was dissolved therein at a temperature of 80° C. for 6 hours using a magnetic bar to prepare a mixed solution. The mixed solution was cooled to room temperature, and then, polyacrylic acid-co-maleic acid (PAM manufactured by Sigma-Aldrich Co. LLC) as a cross-linking agent was mixed into the mixed solution such that the polyacrylic acid-co-maleic acid was included in an amount of 15 parts by weight with respect to 100 parts by weight of the PVA, and was dissolved at room temperature for 12 hours. Isopropyl alcohol (IPA manufactured by Duksan Chemical Co.) was added to the mixed solution such that the isopropyl alcohol was included in an amount of 7,142 parts by weight with respect to 100 parts by weight of the PVA, and was mixed for 2 hours to prepare a hydrophilic coating layer-forming composition.

Example 1

Figure 5A:
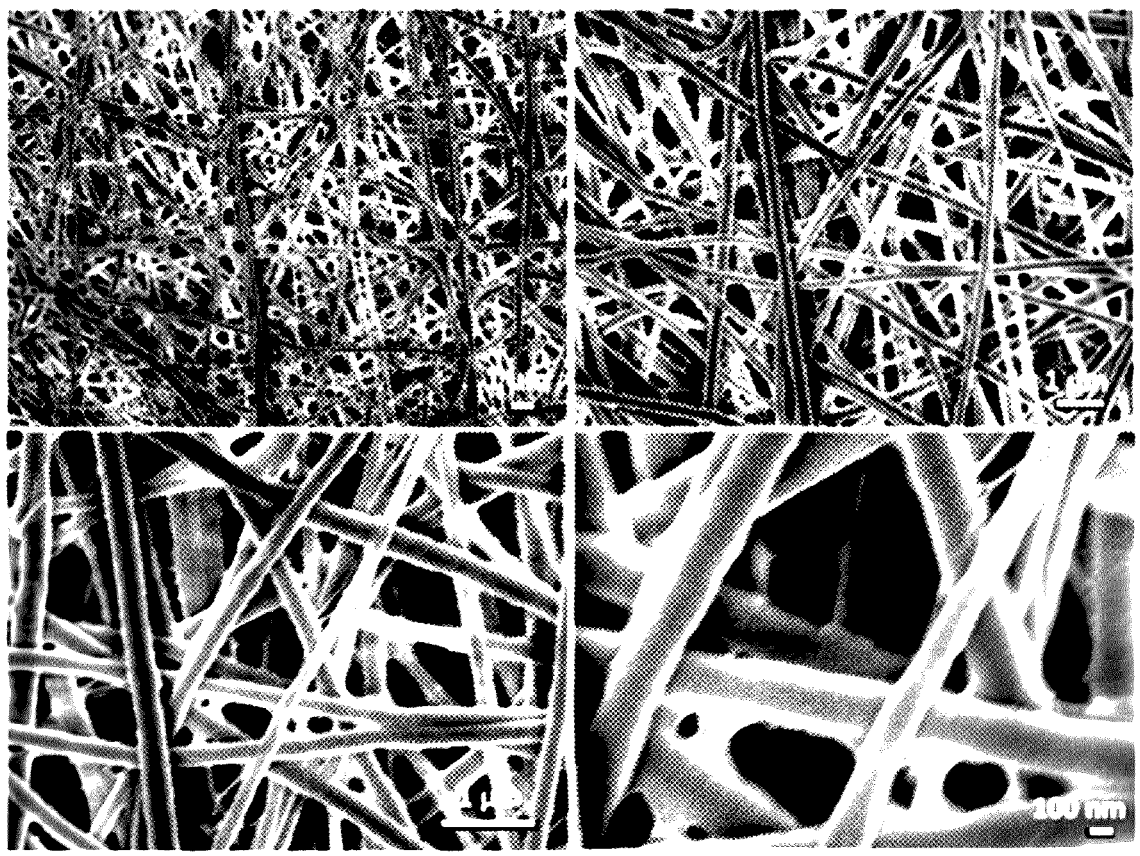
FIGS. 5A and 5B are images of a nanofiber web included in an exemplary embodiment of the present invention, FIG.
Figure 5B:
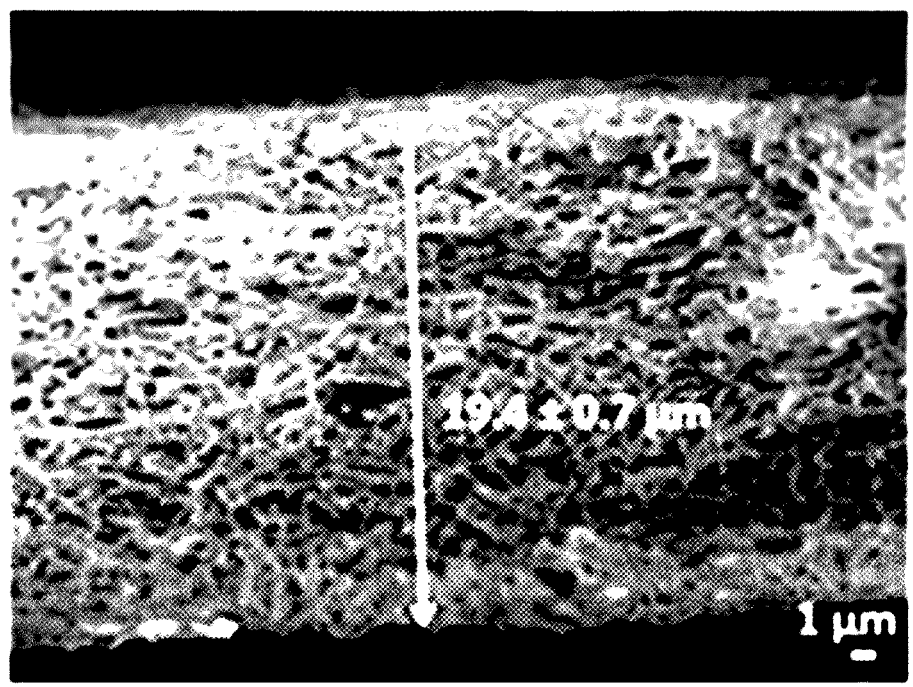

First, in order to prepare a spinning solution, 12 g of polyvinylidene fluoride (Kynar 761 manufactured by Arkema Inc.) as a fiber-forming component was dissolved in 88 g of a mixed solution, which is obtained by mixing dimethylacetamide and acetone in a weight ratio of 70:30, at a temperature of 80° C. for 6 hours using a magnetic bar to prepare a mixed solution. The spinning solution was introduced into a solution tank of an electrospinning device and was ejected at a rate of 15 μl/min/hole. Here, a temperature of a spinning section was maintained at 30° C., humidity was maintained at 50%, and a distance between a collector and a tip of a spin nozzle was 20 cm. After a nonwoven fabric (CCP40 manufactured by Namyang Nonwoven Fabric Co., Ltd) composed of a low melting point composite fiber with a fiber average diameter of 15 μm including polyethylene as a sheath portion and polypropylene as a core portion, which has an average thickness of 200 μm, a basis weight of 40 g/m$^2$, and a melting point of about 120° C., was disposed on the collector as a second support, a voltage of 40 kV or more was applied to a spin nozzle pack using a high voltage generator, and at the same time, an air pressure of 0.03 MPa was applied to each nozzle of the spin pack, thereby forming a stacked body including a nanofiber web composed of a PVDF nanofiber having a fiber average diameter of 0.5 μm on one surface of the second support. Next, in order to dry a solvent and moisture remaining in the nanofiber web of the stacked body and thermally fuse the second support and the nanofiber web, a calendaring process was performed by applying heat with a temperature of 140° C. or more and a pressure of 1 kgf/cm². The formed stacked body had a shape as shown in FIG. 6 and the second support and the nanofiber web were bonded through thermal fusion. The nanofiber web had a shape as shown in FIGS. 5A and 5B and had a three-dimensional network structure. In this case, the nanofiber web had an average thickness of 20 μm and a basis weight of 10 g/m².

Thereafter, the formed stacked body was immersed in the hydrophilic coating layer-forming composition prepared in Preparation Example and dried at a temperature of 110° C. for 5 minutes in a dryer to provide a hydrophilic coating layer on a surface of the nanofiber of the nanofiber web.

Next, the formed stacked body was disposed on each of both surfaces of a first support such that the second support faced the first support. In this case, the first support was composed of a nonwoven fabric (NP450 manufactured by Namyang Nonwoven Fabric Co., Ltd) composed of a low melting point composite fiber with a fiber average diameter of 35 μm including polyethylene as a sheath portion and polypropylene as a core portion, which has an average thickness of 5 mm, a basis weigh of 500 g/m², and a melting point of about 120° C. A filter medium was manufactured by applying heat with a temperature of 140° C. or more and a pressure of 1 kgf/cm².

Examples 2 to 25 and Comparative Examples 1 to 6

Filter media as shown in Tables 1 to 5 were manufactured in the same manner as in Example 1, except a basis weight, thickness, fiber average diameter, and satisfaction of conditions (1) to (3) of each of a first support, a second support, a nanofiber web were changed as in Tables 1 to 5 below.

Experimental Example

The following physical properties of each of the filter media manufactured according to Examples and Comparative Examples were evaluated and shown in Tables 1 to 5.

1. Measurement of Relative Water Permeability

An operation pressure of 50 kPa was applied to a filter unit implemented using each of the filter media manufactured in Examples and Comparative Examples, and water permeability per a specimen area of 0.5 m² was measured. Then, water permeability of each of the filter media according to the remaining Examples and Comparative Examples was measured with respect to 100% of water permeability of the filter medium according to Example 1.

2. Evaluation of Filtration Efficiency

Test dust (ISO, A2 Fine Grade Test Dust) was dispersed in pure water to prepare a suspension having a turbidity of 100 NTU, and filtration efficiency was measured on each of the filter media manufactured in Examples and Comparative Examples by measuring turbidity before and after filtration.

3. Evaluation of Backwashing Durability

The filter unit implemented using each of the filter media manufactured in Examples and Comparative Examples was immersed in water, and an operation pressure of 50 kPa was applied to perform backwashing under a condition in which 400 LMH of water per a specimen area of 0.5 m² is sprayed for 2 minutes. Backwashing durability was evaluated in such a manner that, when there was no abnormality, it was indicated as 0, and when any problem such as peeling of an antimicrobial layer or delamination occurred, it was indicated as X.

TABLE 1

| Category | | Example 1 | Example 2 | Example 3 | Example 4 | Example 5 | Example 6 |
|---|---|---|---|---|---|---|---|
| Basis weight of first support (g/m²) | | 500 | 700 | 600 | 350 | 290 | 500 |
| Basis weight of second support (g/m²) | | 40 | 25 | 35 | 200 | 190 | 190 |
| Basis weight of nanofiber web (g/m²) | | 10 | 3 | 5 | 15 | 25 | 3 |
| Condition (1) | $(b_1 + c_1)/a_1$ | 0.1 | 0.04 | 0.067 | 0.59 | 0.74 | 0.39 |
| | $c_1/b_1$ | 0.25 | 0.12 | 0.14 | 0.079 | 0.13 | 0.016 |
| Thickness of first support (mm) | | 5 | 5 | 5 | 5 | 5 | 5 |
| Thickness of second support (mm) | | 0.2 | 0.2 | 0.2 | 0.2 | 0.2 | 0.2 |
| Thickness of nanofiber web (mm) | | 0.02 | 0.02 | 0.02 | 0.02 | 0.02 | 0.02 |
| Condition (2) | $(b_2 + c_2)/a_2$ | 0.044 | 0.044 | 0.044 | 0.044 | 0.044 | 0.044 |
| | $c_2/b_2$ | 0.1 | 0.1 | 0.1 | 0.1 | 0.1 | 0.1 |
| Fiber average diameter of first support (μm) | | 35 | 35 | 35 | 35 | 35 | 35 |
| Fiber average diameter of second support (μm) | | 15 | 15 | 15 | 15 | 15 | 15 |
| Fiber average diameter of nanofiber web (μm) | | 0.5 | 0.5 | 0.5 | 0.5 | 0.5 | 0.5 |

TABLE 1-continued

| Category | | Example 1 | Example 2 | Example 3 | Example 4 | Example 5 | Example 6 |
|---|---|---|---|---|---|---|---|
| Condition (3) | $(b_3 + c_3)/a_3$ | 0.44 | 0.44 | 0.44 | 0.44 | 0.44 | 0.44 |
| | $c_3/b_3$ | 0.033 | 0.033 | 0.033 | 0.033 | 0.033 | 0.033 |
| Relative water permeability (%) | | 100 | 98 | 97 | 92 | 83 | 97 |
| Filtration efficiency (%) | | 97 | 78 | 93 | 96 | 97 | 79 |
| Backwashing durability | | ○ | x | ○ | ○ | x | x |

TABLE 2

| Category | | Example 7 | Example 8 | Example 9 | Example 10 | Example 11 | Example 12 |
|---|---|---|---|---|---|---|---|
| Basis weight of first support (g/m²) | | 500 | 500 | 500 | 500 | 500 | 500 |
| Basis weight of second support (g/m²) | | 180 | 35 | 30 | 40 | 40 | 40 |
| Basis weight of nanofiber web (g/m²) | | 5 | 15 | 15 | 10 | 10 | 10 |
| Condition (1) | $(b_1 + c_1)/a_1$ | 0.37 | 0.1 | 0.09 | 0.1 | 0.1 | 0.1 |
| | $c_1/b_1$ | 0.028 | 0.43 | 0.5 | 0.25 | 0.25 | 0.25 |
| Thickness of first support (mm) | | 5 | 5 | 5 | 5 | 5 | 3 |
| Thickness of second support (mm) | | 0.2 | 0.2 | 0.2 | 0.08 | 0.15 | 0.38 |
| Thickness of nanofiber web (mm) | | 0.02 | 0.02 | 0.02 | 0.001 | 0.003 | 0.035 |
| Condition (2) | $(b_2 + c_2)/a_2$ | 0.044 | 0.044 | 0.044 | 0.0162 | 0.0306 | 0.1383 |
| | $c_2/b_2$ | 0.1 | 0.1 | 0.1 | 0.0125 | 0.02 | 0.092 |
| Fiber average diameter of first support (μm) | | 35 | 35 | 35 | 35 | 35 | 35 |
| Fiber average diameter of second support (μm) | | 15 | 15 | 15 | 15 | 15 | 15 |
| Fiber average diameter of nanofiber web (μm) | | 0.5 | 0.5 | 0.5 | 0.5 | 0.5 | 0.5 |
| Condition (3) | $(b_3 + c_3)/a_3$ | 0.44 | 0.44 | 0.44 | 0.44 | 0.44 | 0.44 |
| | $c_3/b_3$ | 0.033 | 0.033 | 0.033 | 0.033 | 0.033 | 0.033 |
| Relative water permeability (%) | | 98 | 91 | 91 | 105 | 101 | 90 |
| Filtration efficiency (%) | | 92 | 97 | 95 | 74 | 94 | 97 |
| Backwashing durability | | ○ | ○ | x | x | ○ | ○ |

TABLE 3

| Category | | Example 13 | Example 14 | Example 15 | Example 16 | Example 17 | Example 18 |
|---|---|---|---|---|---|---|---|
| Basis weight of first support (g/m²) | | 500 | 500 | 500 | 500 | 500 | 500 |
| Basis weight of second support (g/m²) | | 40 | 40 | 40 | 40 | 40 | 40 |
| Basis weight of nanofiber web (g/m²) | | 10 | 10 | 10 | 10 | 10 | 10 |
| Condition (1) | $(b_1 + c_1)/a_1$ | 0.1 | 0.1 | 0.1 | 0.1 | 0.1 | 0.1 |
| | $c_1/b_1$ | 0.25 | 0.25 | 0.25 | 0.25 | 0.25 | 0.25 |
| Thickness of first support (mm) | | 1.5 | 5 | 5 | 5 | 5 | 5 |
| Thickness of second support (mm) | | 0.4 | 0.5 | 0.38 | 0.15 | 0.08 | 0.2 |
| Thickness of nanofiber web (mm) | | 0.05 | 0.001 | 0.002 | 0.08 | 0.11 | 0.02 |
| Condition (2) | $(b_2 + c_2)/a_2$ | 0.3 | 0.1002 | 0.0764 | 0.046 | 0.038 | 0.044 |
| | $c_2/b_2$ | 0.125 | 0.002 | 0.0053 | 0.53 | 1.38 | 0.1 |
| Fiber average diameter of first support (μm) | | 35 | 35 | 35 | 35 | 35 | 55 |
| Fiber average diameter of second support (μm) | | 15 | 15 | 15 | 15 | 15 | 8 |
| Fiber average diameter of nanofiber web (μm) | | 0.5 | 0.5 | 0.3 | 0.8 | 0.5 | 0.1 |

TABLE 3-continued

| Category | | Example 13 | Example 14 | Example 15 | Example 16 | Example 17 | Example 18 |
|---|---|---|---|---|---|---|---|
| Condition (3) | $(b_3 + c_3)/a_3$ | 0.44 | 0.44 | 0.437 | 0.53 | 0.44 | 0.15 |
| | $c_3/b_3$ | 0.033 | 0.033 | 0.02 | 0.033 | 0.033 | 0.013 |
| Relative water permeability (%) | | 74 | 105 | 100 | 85 | 54 | 99 |
| Filtration efficiency (%) | | 98 | 76 | 95 | 93 | 99 | 82 |
| Backwashing durability | | x | x | ○ | ○ | x | x |

TABLE 4

| Category | | Example 19 | Example 20 | Example 21 | Example 22 | Example 23 | Example 24 | Example 25 |
|---|---|---|---|---|---|---|---|---|
| Basis weight of first support (g/m²) | | 500 | 500 | 500 | 500 | 500 | 500 | 500 |
| Basis weight of second support (g/m²) | | 40 | 40 | 40 | 40 | 40 | 40 | 40 |
| Basis weight of nanofiber web (g/m²) | | 10 | 10 | 10 | 10 | 10 | 10 | 10 |
| Condition (1) | $(b_1 + c_1)/a_1$ | 0.1 | 0.1 | 0.1 | 0.1 | 0.1 | 0.1 | 0.1 |
| | $c_1/b_1$ | 0.25 | 0.25 | 0.25 | 0.25 | 0.25 | 0.25 | 0.25 |
| Thickness of first support (mm) | | 5 | 5 | 5 | 5 | 5 | 5 | 5 |
| Thickness of second support (mm) | | 0.2 | 0.2 | 0.2 | 0.2 | 0.2 | 0.2 | 0.2 |
| Thickness of nanofiber web (mm) | | 0.02 | 0.04 | 0.02 | 0.02 | 0.02 | 0.02 | 0.02 |
| Condition (2) | $(b_2 + c_2)/a_2$ | 0.044 | 0.048 | 0.044 | 0.044 | 0.044 | 0.044 | 0.044 |
| | $c_2/b_2$ | 0.1 | 0.2 | 0.1 | 0.1 | 0.1 | 0.1 | 0.1 |
| Fiber average diameter of first support (μm) | | 45 | 20 | 20 | 35 | 35 | 35 | 20 |
| Fiber average diameter of second support (μm) | | 10 | 25 | 35 | 35 | 25 | 10 | 4 |
| Fiber average diameter of nanofiber web (μm) | | 0.1 | 0.7 | 0.9 | 0.1 | 0.1 | 0.8 | 0.5 |
| Condition (3) | $(b_3 + c_3)/a_3$ | 0.22 | 1.29 | 1.8 | 1 | 0.72 | 0.31 | 0.23 |
| | $c_3/b_3$ | 0.01 | 0.028 | 0.026 | 0.0029 | 0.004 | 0.08 | 0.13 |
| Relative water permeability (%) | | 96 | 85 | 71 | 94 | 95 | 99 | 64 |
| Filtration efficiency (%) | | 85 | 85 | 79 | 83 | 85 | 85 | 87 |
| Backwashing durability | | ○ | ○ | x | x | ○ | ○ | x |

TABLE 5

| Category | | Comparative Example 1 | Comparative Example 2 | Comparative Example 3 | Comparative Example 4 | Comparative Example 5 | Comparative Example 6 |
|---|---|---|---|---|---|---|---|
| Basis weight of first support (g/m²) | | 200 | 500 | 500 | 500 | 500 | 500 |
| Basis weight of second support (g/m²) | | 250 | 8 | 40 | 40 | 40 | 40 |
| Basis weight of nanofiber web (g/m²) | | 25 | 24 | 10 | 10 | 10 | 10 |
| Condition (1) | $(b_1 + c_1)/a_1$ | 1.38 | 0.064 | 0.1 | 0.1 | 0.1 | 0.1 |
| | $c_1/b_1$ | 0.1 | 3 | 0.25 | 0.25 | 0.25 | 0.25 |
| Thickness of first support (mm) | | 5 | 5 | 1.5 | 5 | 5 | 5 |
| Thickness of second support (mm) | | 0.2 | 0.2 | 0.5 | 0.08 | 0.2 | 0.2 |
| Thickness of nanofiber web (mm) | | 0.02 | 0.02 | 0.3 | 0.25 | 0.02 | 0.02 |
| Condition (2) | $(b_2 + c_2)/a_2$ | 0.044 | 0.044 | 0.53 | 0.066 | 0.044 | 0.044 |
| | $c_2/b_2$ | 0.1 | 0.1 | 0.6 | 3.125 | 0.1 | 0.1 |
| Fiber average diameter of first support (μm) | | 35 | 35 | 35 | 35 | 4 | 35 |
| Fiber average diameter of second support (μm) | | 15 | 15 | 15 | 15 | 35 | 4 |
| Fiber average diameter of nanofiber web (μm) | | 0.5 | 0.5 | 0.5 | 0.5 | 1.2 | 1.2 |

TABLE 5-continued

| Category | | Comparative Example 1 | Comparative Example 2 | Comparative Example 3 | Comparative Example 4 | Comparative Example 5 | Comparative Example 6 |
|---|---|---|---|---|---|---|---|
| Condition (3) | $(b_3 + c_3)/a_3$ | 0.44 | 0.44 | 0.44 | 0.44 | 9.05 | 0.15 |
| | $c_3/b_3$ | 0.033 | 0.033 | 0.033 | 0.033 | 0.034 | 0.3 |
| Relative water permeability (%) | | 84 | 83 | 96 | 90 | 82 | 78 |
| Filtration efficiency (%) | | 87 | 82 | 89 | 76 | 80 | 86 |
| Backwashing durability | | x | x | x | x | x | x |

As can be seen from Tables 1 to 5, it can be seen that Examples 1, 3, 4, 7, 8, 11, 12, 15, 16, 19, 20, 23, and 24 satisfying all of the basis weight, thickness, and fiber average diameter of each of the first support, the second support, and the nanofiber web according to the present invention, and conditions (1) to (3) concurrently have considerably excellent water permeability, filtration efficiency, and backwashing durability as compared with Examples 2, 5, 6, 9, 10, 13, 14, 17, 18, 21, 22, and 25, and Comparative Examples 1 to 6, from which even one of the basis weight, thickness, fiber average diameter, and conditions (1) to (3) is missing.

While one exemplary embodiment of the present invention has been described above, the present invention is not limited to the embodiment presented herein. One skilled in the art may easily suggest other embodiments due to addition, modification, deletion, and the like of components within the scope and spirit of the present invention, and the addition, modification, deletion, and the like of the components fall within the scope and spirit of the present invention.

The invention claimed is:

1. A filter medium comprising:
a second support with porosity and a nanofiber web which are sequentially stacked on each of an upper portion and a lower portion of a first support with porosity; and
a channel through which a filtrate filtered in the nanofiber web flows in a direction of the first support,
wherein the nanofiber web comprises a PVDF nanofiber,
wherein the nanofiber is formed with a hydrophilic coating layer on a surface, and
wherein the hydrophilic coating layer includes 2 to 20 parts by weight of polyacrylic acid-co-maleic acid based on 100 parts by weight of PVA,
wherein the nanofiber web has a fiber average diameter ranging from 0.05 μm to 0.5 μm,
wherein the first support, the second support, and the nanofiber web satisfy condition (1), condition (2), and condition (3) below:

$0.067 \leq (b_1+c_1)/a_1 \leq 0.59$ and $0.028 \leq c_1/b_1 \leq 0.43$, (1)

$0.0306 \leq (b_2+c_2)/a_2 \leq 0.1383$ and $0.0053 \leq c_2/b_2 \leq 0.53$, and (2)

$0.31 \leq (b_3+c_3)/a_3 \leq 0.72$ and $0.01 \leq c_3/b_3 \leq 0.033$, (3)

wherein $a_1$, $b_1$, and $c_1$ respectively refer to basis weights (g/m$^2$) of the first support, the second support, and the nanofiber web,
$a_2$, $b_2$, and $c_2$ respectively refer to thicknesses (mm) of the first support, the second support, and the nanofiber web, and
$a_3$, $b_3$, and $c_3$ respectively refer to fiber average diameters (μm) of the first support, the second support, and the nanofiber web.

2. The filter medium of claim 1, wherein the first support has a basis weight ranging from 250 g/m$^2$ to 800 g/m$^2$, the second support has a basis weight ranging from 10 g/m$^2$ to 200 g/m$^2$, and
the nanofiber web has a basis weight ranging from 0.05 g/m$^2$ to 20 g/m$^2$.

3. The filter medium of claim 1, wherein the first support has a thickness ranging from 2 mm to 8 mm,
the second support has a thickness ranging from 100 μm to 400 μm, and
the nanofiber web has a thickness ranging from 0.5 μm to 200 μm.

4. The filter medium of claim 1, wherein the first support has a fiber average diameter ranging from 5 μm to 50 μm, and
the second support has a fiber average diameter ranging from 5 μm to 30 μm.

5. The filter medium of claim 1, wherein the second support includes a second composite fiber which includes a support component and a low melting point component and is disposed such that at least a portion of the low melting point component is exposed at an outer surface thereof, and
the low melting point component of the second composite fiber is fused to the nanofiber web.

6. The filter medium of claim 5, wherein the first support includes a first composite fiber which includes a support component and a low melting point component and is disposed such that at least a portion of the low melting point component is exposed at an outer surface thereof, and
the low melting point component of the first composite fiber and the low melting point component of the second composite fiber are fused to each other to bond the first support and the second support.

7. The filter medium of claim 1, wherein the nanofiber web has an average pore size ranging from 0.1 μm 3 μm and a porosity ranging from 60% to 90%.

8. The filter medium of claim 1, wherein the filter medium is an ultrafiltration membrane.

9. A manufacturing method of a filter medium, comprising:
(1) laminating a nanofiber web and a second support; and
(2) disposing the laminated nanofiber web and second support on each of both surfaces of a first support such that the second support is in contact with the first support and performing laminating thereon,
wherein the nanofiber web comprises a PVDF nanofiber,
wherein the nanofiber is formed with a hydrophilic coating layer on a surface, and
wherein the hydrophilic coating layer includes 2 to 20 parts by weight of polyacrylic acid-co-maleic acid based on 100 parts by weight of PVA,
wherein the nanofiber web has a fiber average diameter ranging from 0.05 μm to 0.5 μm, wherein the first support, the second support, and the nanofiber web satisfy at least one condition selected from condition (1), condition (2), and condition (3) below:

$$0.067 \leq (b_1+c_1)/a_1 \leq 0.59 \text{ and } 0.028 \leq c_1/b_1 \leq 0.43, \quad (1)$$

$$0.0306 \leq (b_2+c_2)/a_2 \leq 0.1383 \text{ and } 0.0053 \leq c_2/b_2 \leq 0.53, \text{ and} \quad (2)$$

$$0.31 \leq (b_3+c_3)/a_3 \leq 0.72 \text{ and } 0.01 \leq c_3/b_3 \leq 0.033, \quad (3)$$

wherein $a_1$, $b_1$, and $c_1$ respectively refer to basis weights (g/m$^2$) of the first support, the second support, and the nanofiber web, $a_2$, $b_2$, and $c_2$ respectively refer to thicknesses (mm) of the first support, the second support, and the nanofiber web, and $a_3$, $b_3$, and $c_3$ respectively refer to fiber average diameters (μm) of the first support, the second support, and the nanofiber web.

10. The manufacturing method of claim 9, wherein operation (1) includes 1-1) electrospinning a nanofiber on the second support to form the nanofiber web, and 1-2) laminating the nanofiber web and the second support by applying heat and pressure in both directions of the second support on which the nanofiber web is formed.

11. A flat filter unit comprising:

the filter medium according to claim 1; and a support frame which includes a channel configured to allow a filtrate filtered in the filter medium to be discharged to the outside and supports an edge of the filter medium.

* * * * *